(12) United States Patent
Shin et al.

(10) Patent No.: US 8,185,713 B2
(45) Date of Patent: May 22, 2012

(54) FLEXIBLE SEQUENCER DESIGN ARCHITECTURE FOR SOLID STATE MEMORY CONTROLLER

(75) Inventors: Hyunsuk Shin, Santa Clara, CA (US); Chi Kong Lee, Fremont, CA (US); Tony Yoon, Cupertino, CA (US)

(73) Assignee: Marvell World Travel Ltd., St. Michael (BB)

( * ) Notice: Subject to any disclaimer, the term of this patent is extended or adjusted under 35 U.S.C. 154(b) by 856 days.

(21) Appl. No.: 12/212,636

(22) Filed: Sep. 17, 2008

(65) Prior Publication Data

US 2009/0077305 A1 Mar. 19, 2009

Related U.S. Application Data

(60) Provisional application No. 60/973,579, filed on Sep. 19, 2007.

(51) Int. Cl.
*G06F 13/18* (2006.01)
(52) U.S. Cl. ....................................... 711/167
(58) Field of Classification Search .................... None
See application file for complete search history.

(56) References Cited

U.S. PATENT DOCUMENTS

| 2002/0004878 | A1* | 1/2002 | Norman | 711/103 |
| 2002/0174297 | A1* | 11/2002 | McDonald et al. | 711/114 |
| 2003/0070036 | A1* | 4/2003 | Gorobets | 711/103 |
| 2004/0044933 | A1* | 3/2004 | Jeddeloh | 714/718 |

FOREIGN PATENT DOCUMENTS

| WO | 03/029951 A | 4/2003 |
| WO | 2006/123919 A | 11/2006 |

* cited by examiner

*Primary Examiner* — Duc Doan

(57) ABSTRACT

A method and apparatus for controlling access to solid state memory devices which may allow maximum parallelism on accessing solid state memory devices with minimal interventions from firmware. To reduce the waste of host time, multiple flash memory devices may be connected to each channel. A job/descriptor architecture may be used to increase parallelism by allowing each memory device to operate separately. A job may be used to represent a read, write or erase operation. When firmware wants to assign a job to a device, it may issue a descriptor, which may contain information about the target channel, the target device, the type of operation, etc. The firmware may provide descriptors without waiting for a response from a memory device, and several jobs may be issued continuously to form a job queue. After the firmware finishes programming descriptors, a sequencer may handle the remaining work so that the firmware may concentrate on other tasks.

34 Claims, 37 Drawing Sheets

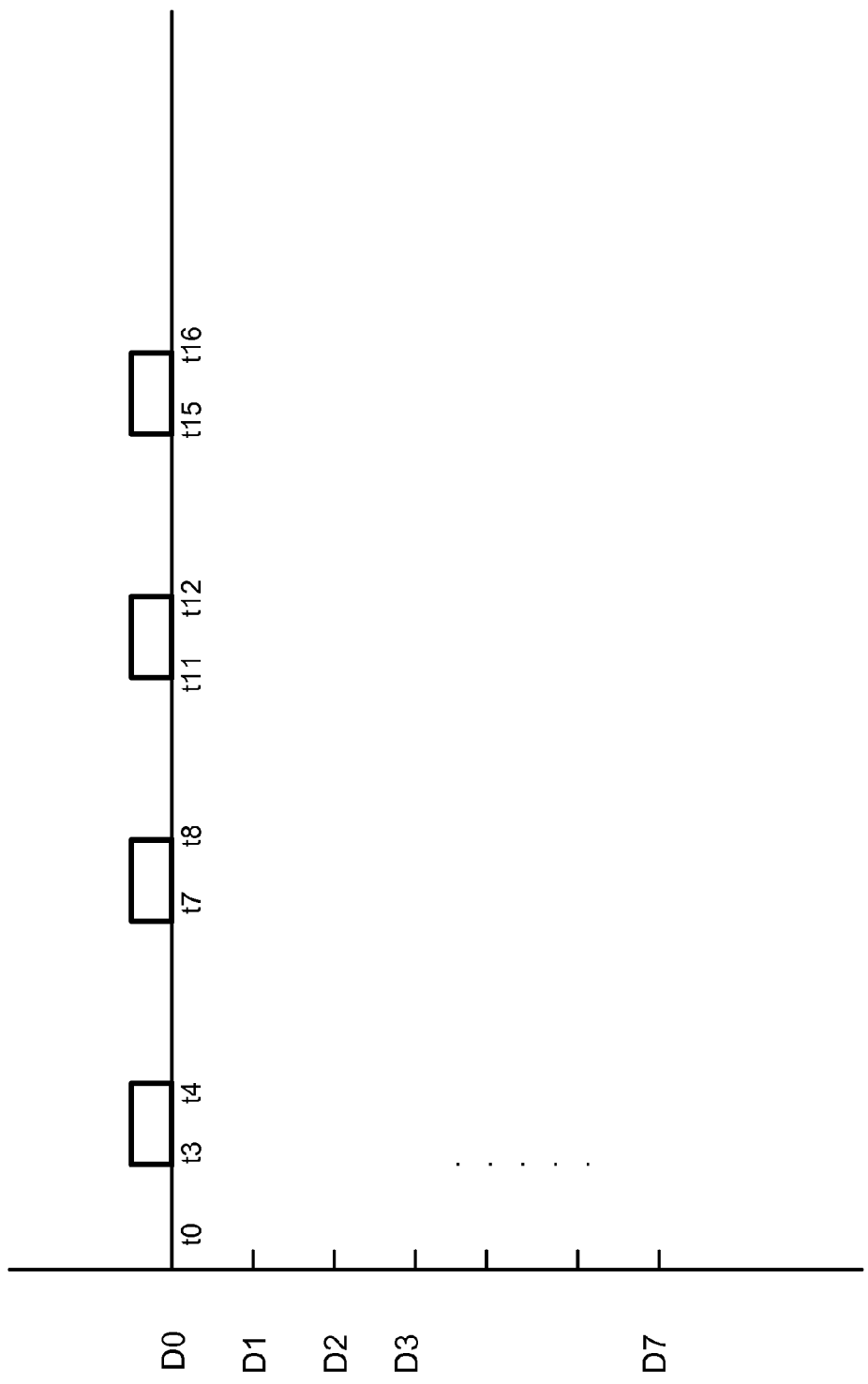

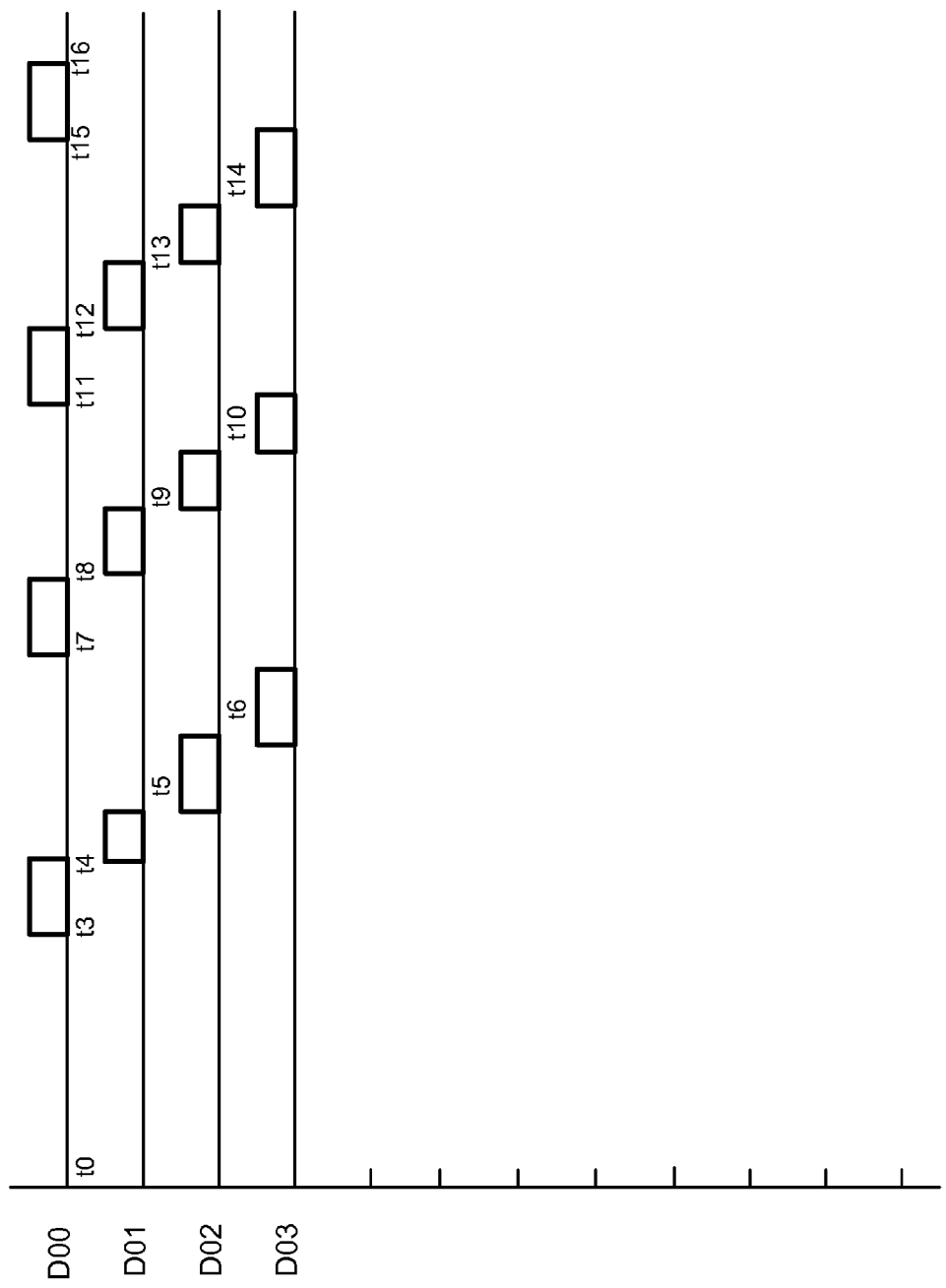

FLEXIBLE SEQUENCER DESIGN ARCHITECTURE FOR SOLID STATE MEMORY CONTROLLER

CROSS REFERENCE TO RELATED APPLICATION

This application claims the benefit of priority to previously filed U.S. provisional patent application Ser. No. 60/973,579, filed Sep. 19, 2007, entitled FLEXIBLE SEQUENCER DESIGN ARCHITECTURE FOR SOLID STATE MEMORY CONTROLLER. That provisional application is hereby incorporated by reference in its entirety.

BACKGROUND

1. Field of the Invention

The present invention relates generally to solid state memory controllers, and more particularly to a sequencer for solid state memory controllers.

2. Description of Related Art

The performance and capacity of a solid state drive depend on parallelism on accessing solid state memory devices, e.g., flash memory devices. FIG. 1A illustrates a currently available system for controlling access to solid state memory devices. As shown, a flash controller 101 may communicate with a host 102 through a buffer 103 on one side, and communicate with flash memory devices D0-D7 through channels CH0-CH7 on another side, with each channel dedicated to one memory device. The flash memory devices D0-D7 may be NAND or NOR flash memory devices. The flash controller 101 may have an ECC (Error Correcting Code) section 1011, a formatter 1012, a flash I/F controller 1013, and a sequencer 1014. The ECC section 1011 may correct errors in a data flow passing through it, the formatter 1012 may convert the format of a data flow from the host 102 to conform with requirements of the flash I/F controller 1013 and convert the format of a data flow from a flash memory device to conform with requirements of the host 102, and the flash I/F controller 1013 may be an interface between the flash controller 101 and the flash memory devices D0-D7. Firmware 104 may generate control signals to the flash controller 101. A sequencer 1014 may receive the control signals from the firmware 104 and control the ECC section 1011, the formatter 1012 and the flash I/F controller 1013 accordingly.

During a write operation to the flash memory device D0, the flash controller 101 may receive data from the host 102 via the buffer 103. In the flash controller 101, the data from the host 102 may pass through the ECC section 1011, the formatter 1012 and the flash I/F controller 1013, and finally be sent to an internal buffer in a flash memory device. The data may then be moved from the internal buffer to the flash memory device.

FIG. 1B illustrates the waveform of a write operation in the system shown in FIG. 1A. As shown, for the flash memory device D0, data may be transferred from the flash controller 101 to an internal buffer in the device D0 from time t0 to t1, and may be moved from the internal buffer to the device D0 from t1 to t4. Then the device D0 may send out a confirmation indicating that the write operation is finished, so that the next operation request may start to be processed. Although the host 102 is not involved in the transaction between the internal buffer and the device D0, t1 to t4, the host 102 cannot process the next operation request until t4. Since the time period for t1 to t4 is much longer than the time period from t0 to t1, a lot of host time is wasted. In one example, the ratio between the time period from t0 to t1 and the time period from t1 to t4 is about 1:4.

During an operation to read data from the flash memory D0, the requested data may be moved from the flash memory device D0 to its internal buffer first. The data may then be transferred from the internal buffer of the flash memory device D0 to the flash controller 101. In the flash controller 101, the data may pass through the flash I/F controller 1013, the formatter 1012, and the ECC section 1011, and finally be sent to the host 102 through the buffer 103.

FIG. 1C illustrates the waveform of a read operation in the system shown in FIG. 1A. As shown, data may be moved from the flash memory device D0 to its internal buffer from time t0 to t3, and may be transferred from the internal buffer to the host from t3 to t4. Again, the host 102 is not involved in the transaction between the device D0 to its internal buffer, but the host 102 cannot do anything from t0 to t3, or t4 to t7. Consequently, considerable host time may be wasted.

Thus, it may be desirable to provide a solid state memory controller which may use the host time more efficiently.

SUMMARY OF THE INVENTION

The present invention may allow maximum parallelism on accessing solid state memory devices with minimal interventions from firmware. To reduce the waste of host time, multiple flash memory devices may be connected to each channel.

A job/descriptor architecture may be used to increase parallelism by allowing each memory device to be operated separately. A job may be used to represent a read, write, or erase operation. When firmware wants to assign a job to a device, it may issue a descriptor, which may contain information about the target channel, the target device, the type of operation, etc. The firmware may provide descriptors without waiting for a response from a memory device, and several jobs may be issued continuously to form a job queue. After the firmware finishes programming descriptors, a sequencer may handle the remaining work so that the firmware may concentrate on other tasks.

The sequencer may help to utilize as many flash memory devices in parallel as possible and utilize all available bandwidth effectively. The sequencer may check the availability of the target channel and the target device of the descriptor at the top of the job queue, and issue the descriptor as soon as the target memory device of the descriptor becomes available. Since there is no need to complete the previous job before issuing a new descriptor, several descriptors may be issued and performed in parallel as long as the target devices are available. The parallelism may be maximized by properly ordering descriptors.

Because of the job queue, the firmware does not have to keep track of the status of each descriptor. Instead, the firmware may put several descriptors into a single track by setting a T-bit of a descriptor. For example, if the firmware wants to put 16 descriptors in a single track, the T-bit of the $16^{th}$ descriptor may be set. The sequencer may generate an interrupt signal to the firmware when a track is completed, i.e., when all jobs defined in the descriptors in the track are complete. The firmware may program descriptors per track boundary, and also may check the status of completed jobs in the track boundary. To increase bandwidth, several tracks may be issued in parallel if target devices are available.

To support the track architecture, the sequencer may collect status of each job in a "Track Status Register". Once a track is completed and an interrupt signal is generated, the firmware may check the "Track Status Register" to find out if there is any job in the track that has failed. In addition, the sequencer may provide information such as which descriptors are issued, which job is completed, which job is pending, etc, so that the firmware may easily diagnose and recover from errors.

BRIEF DESCRIPTION OF THE DRAWING FIGURES

Embodiments of the present invention are described herein with reference to the accompanying drawings, similar reference numbers being used to indicate functionally similar elements.

FIG. 1C illustrates the waveform of a read operation in the system shown in FIG. 1A.

FIG. 2C illustrates waveforms of read operations in the system shown in FIG. 2A.

DETAILED DESCRIPTION

1. The System for Accessing Solid State Memory Devices

Figure 1A:
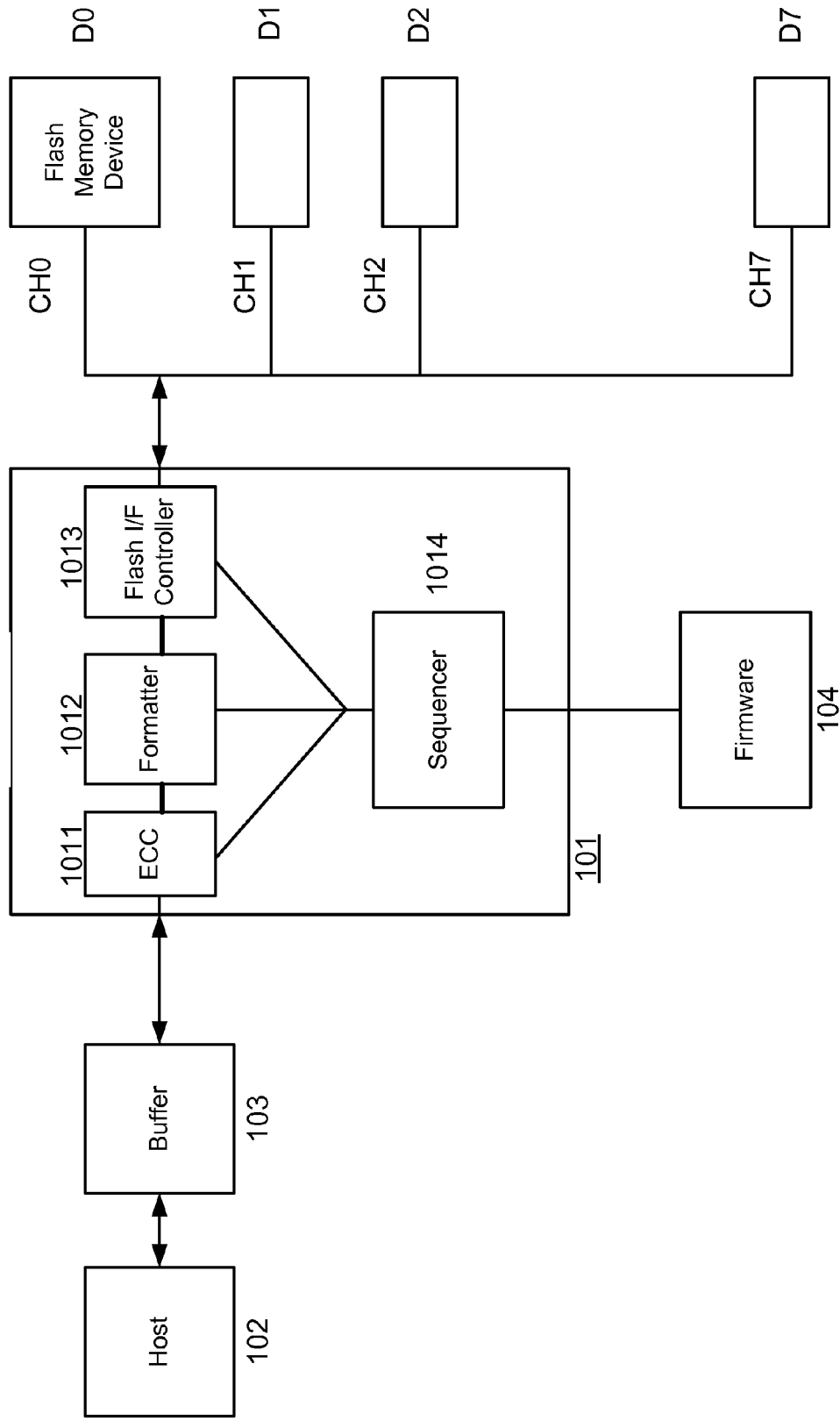
FIG. 1A illustrates a currently available system for controlling access to solid state memory devices.
Figure 1B:
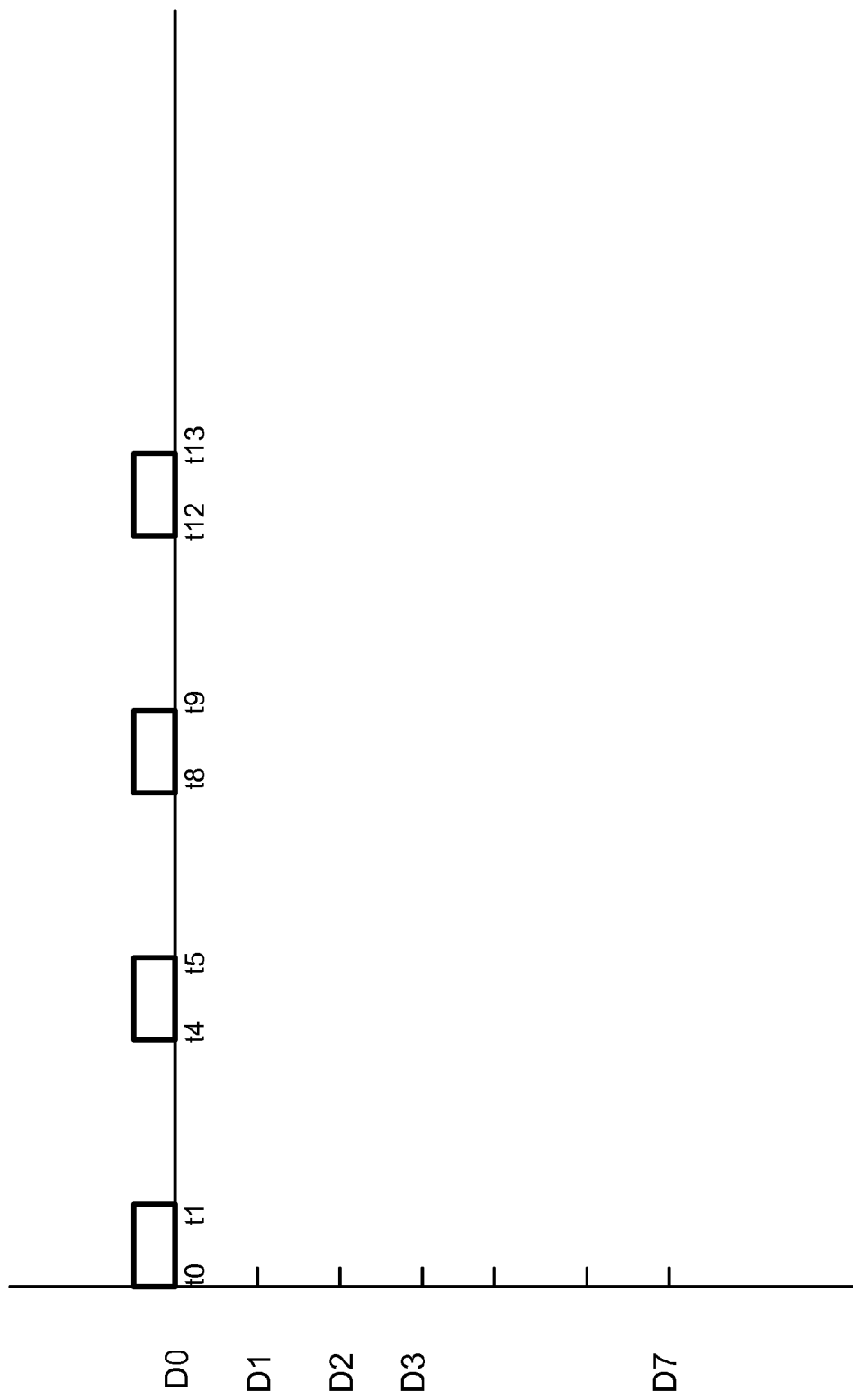
FIG. 1B illustrates the waveform of a write operation in the system shown in FIG. 1A.
Figure 2A:
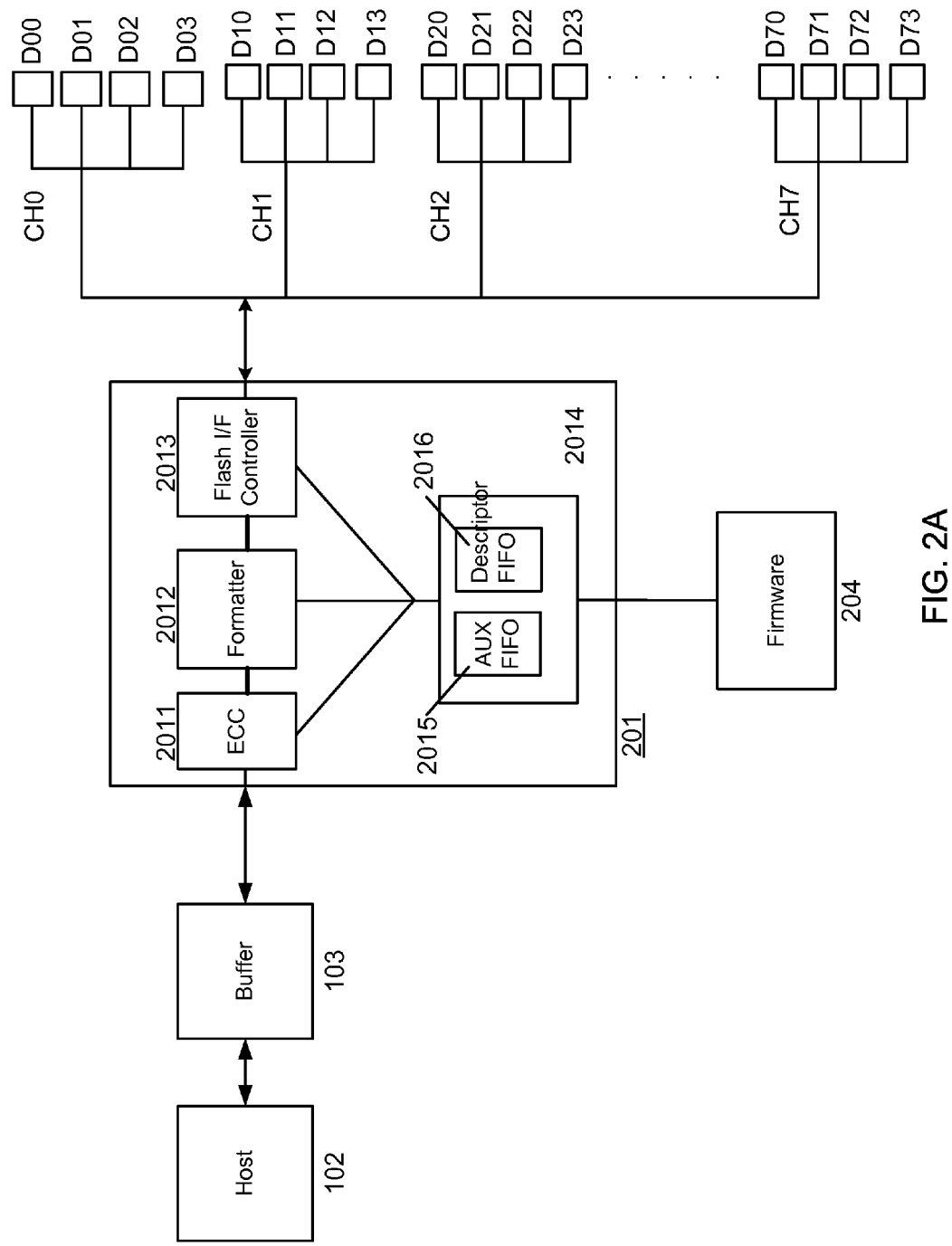
FIG. 2A illustrates a system for controlling access to solid state memory devices according to one embodiment of the present invention.

FIG. 2A illustrates a system for controlling access to solid state memory devices according to one embodiment of the present invention. As shown, a number of flash memory devices may be connected to each channel. In one embodiment, four such flash memory devices D00, D01, D02 and D03 are connected to the channel CH0. A flash controller 201 may have a sequencer 2014, an ECC section 2011, a formatter (FM) 2012 and a flash I/F controller (FC) 2013. The sequencer 2014 may be coupled to firmware (FW) 204 on one side, and coupled to the ECC section 2011, the formatter 2012 and the flash I/F controller 2013 on the other side.

Figure 2B:
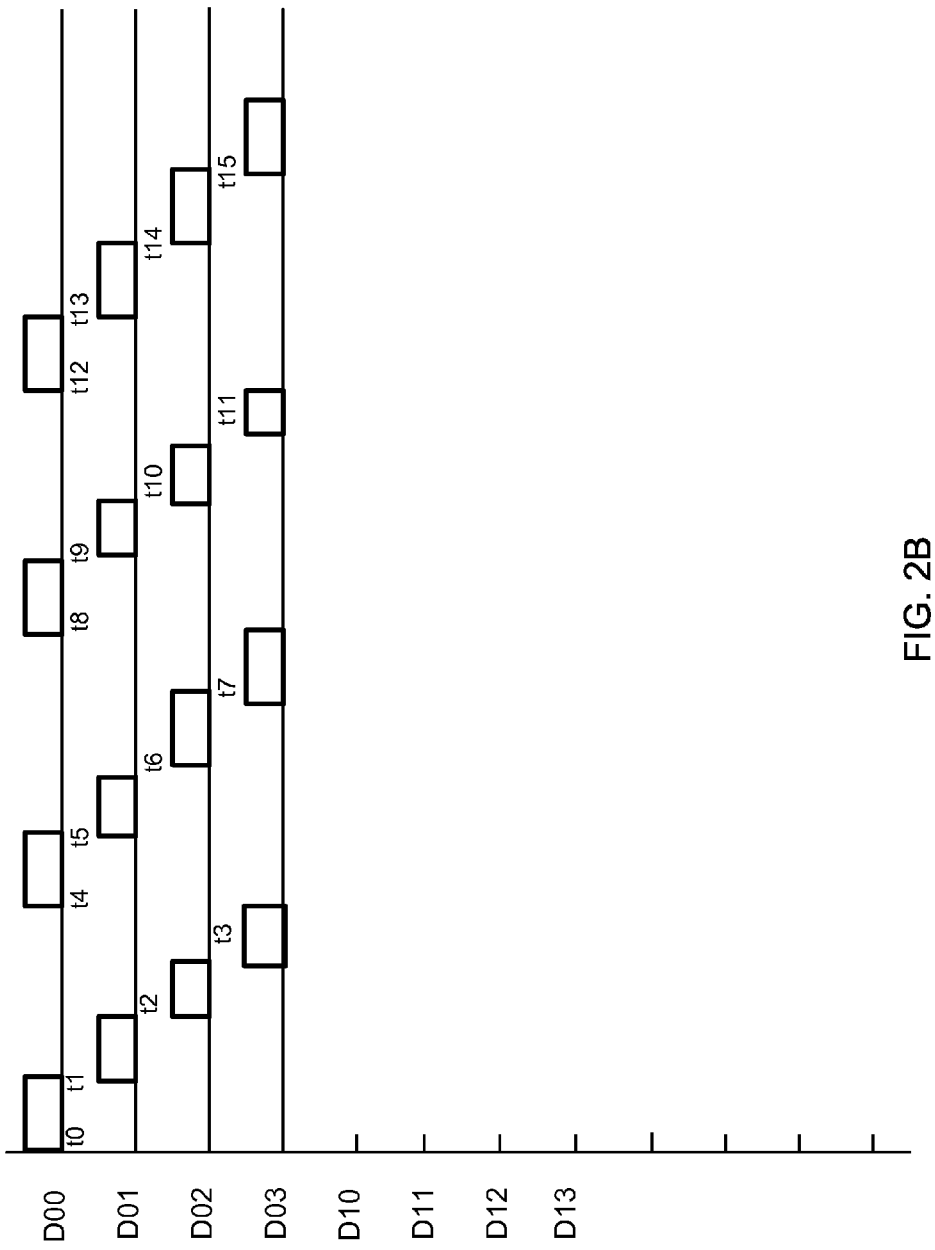
FIG. 2B illustrates waveforms of write operations in the system shown in FIG. 2A.

FIG. 2B illustrates waveforms of write operations in the system shown in FIG. 2A. As shown, the host 102 may start to transfer data to an internal buffer of the flash memory device D00 at t0. From t1 to t2, while data is being moved from the internal buffer of the flash memory device D00 to the flash memory device D00, the host 102 may start to transfer data to an internal buffer of the flash memory device D01. From t2 to t3, before the write operations to D00 and D01 finish, the host 102 may start to transfer data to an internal buffer of the flash memory device D02. From t3 to t4, before the write operations to D00, D01 and D02 finish, the host 102 may start to transfer data to the internal buffer of the flash memory device D03. At that point, the host 102 may start a second write operation to the flash memory device D00. Thus, during one cycle t0 to t4, instead of waiting for the write operation to the flash memory device D00 to finish, the host 102 may perform write operations to flash memory devices D01, D02, and D03, and the waste of host time may be minimized.

FIG. 2C illustrates waveforms of read operations in the system shown in FIG. 2A. Flash memory devices D00-D04 may receive read requests from the host 102 and may start to move the requested data to their internal buffers respectively at t0. For the flash memory device D00, the requested data may be transferred from its internal buffer to the host 102 from t3 to t4. For the flash memory device D01, since the requested data has already been moved to its internal buffer, the data transfer from its internal buffer to the host 102 may start at t4, immediately after the data transfer from the internal buffer of the flash memory device D00 to the host 102 has been finished. Similarly, data transfer from the internal buffer of the flash memory device D02 may start at t5, and data transfer from the internal buffer of the flash memory device D03 may start at t6.

2. The Flexible Sequencer

As shown in FIG. 2A, the flexible sequencer 2014 may sit between the firmware 204 and the ECC (RS/BCH) section 2011, the formatter 2012 and the flash I/F controller 2013, and handling all communications therebetween, except for configuration and status registers.

2.1 Operation Boundaries

Figure 3:
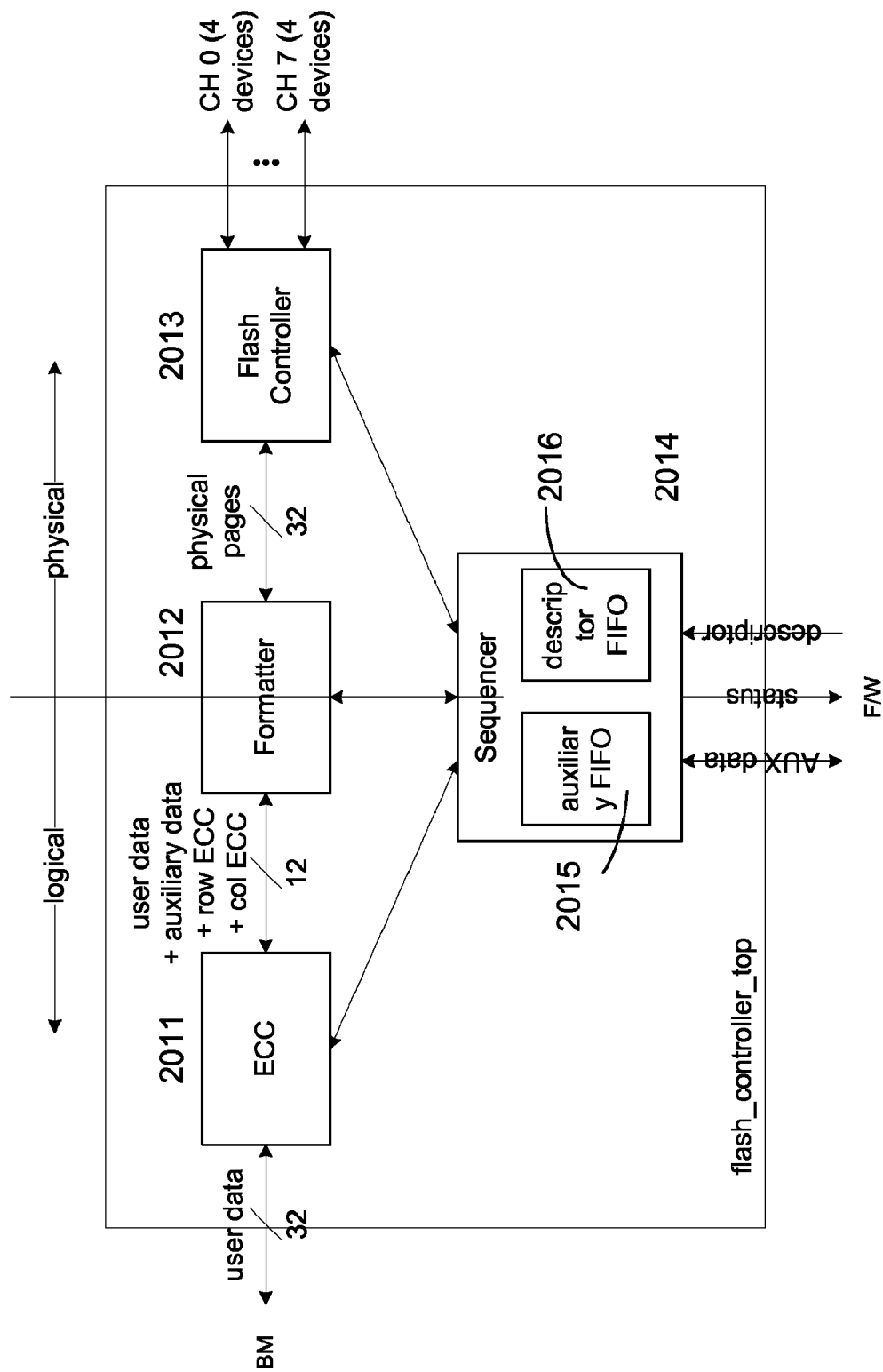
FIG. 3 illustrates operation boundaries of a flash controller according to one embodiment of the present invention.

A sequencer may be located in the middle of the physical domain and the logical domain as shown in FIG. 3. Flash devices, e.g., D00-D03, ... D70-D73, and their addressing schemes are based on the physical domain while the addressing scheme of the host 102 is based on the logical domain. Since the physical domain and the logical domain are not always aligned with respect to the data boundary, each domain may have its own operation unit—an AU (Allocation Unit) for the logical domain and a physical page for the physical domain.

The main purpose of the sequencer 2014 may be to give separate control on the physical domain and the logical domain so that each domain may work independently. In one embodiment, the sequencer 2014 may have a circular FIFO 2015 located in the logical domain and a circular FIFO 2016 located in the physical domain. Consequently, the physical domain and the logical domain may be controlled independently by their own respective FIFO.

The firmware 204 may be responsible for providing all physical and logical information or parameters used to perform a particular operation by programming both of the FIFOs. While the firmware 204 is filling both the logical FIFO 2015 and the physical FIFO 2016, the sequencer 2014 may trigger both FIFOs independently so that logical blocks may start operation in the AU boundary and physical blocks may start operation in the physical page boundary simultaneously.

2.1.1 Physical Boundary

A descriptor may define operation of one physical page in a flash device, e.g., D00-D03, ... D70-D73. The descriptor may have all the information for the flash I/F controller 2013 to access a flash device such as target channel number, target device number, data address, operation type, etc.

Since multiple flash devices may be utilized in parallel, several descriptors may be combined into one single track. A track is a basic unit for parallelization in the physical domain. All descriptors in a single operation may belong to the same type of operation, e.g., PROG (program), READ and ERASE. A single track may be of the same type as well. PROG and READ cannot be mixed within a single track, but PROG and ERASE, or READ and ERASE can be mixed within a single track. In FIG. 2A, since there are 8 channels and each channel supports 4 devices, the maximum number of flash devices which can be handled in parallel is 32. Accordingly, one single track may be composed of up to 32 descriptors.

Figure 4:
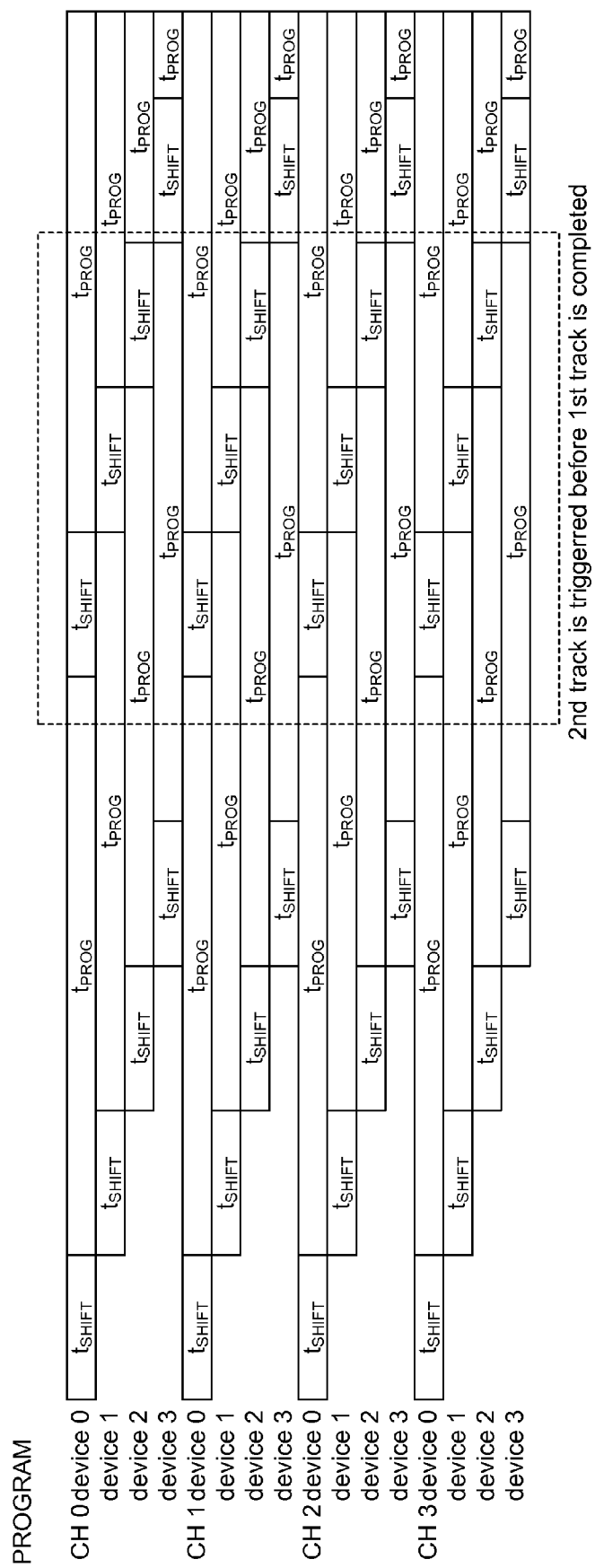
FIG. 4 illustrates waveforms of operations of flash memory devices according to one embodiment of the present invention.

A flash device may have a certain ratio between tR (time to finish a read operation)/tPROG (time to finish a PROG operation) and data transfer time, which means that multiple devices may be initialized to compensate for long tR/tPROG and maximize performance. For example, FIG. 4 shows that the tPROG to data transfer time ratio is about 4:1. Consequently, 4 flash devices may be utilized to keep data flowing without stalling.

To optimize flash device operation, multiple active tracks may be supported so that the following track may be executed while some descriptors of the previous track are still pending as shown in FIG. 4. The firmware 204 may change the number of active tracks by programming MAX_ACT_TRK (maximum number of active tracks permitted).

2.1.2 Logical Boundary

User data from the host 102 may be processed on the AU boundary which is a basic unit for the ECC processing. Since the host 102 processes data in the logical domain using LBA (Logical Block Address), each AU may have one corresponding LBA. By using the AUX FIFO 2015, the firmware 204 may attach LBA data to an AU block when writing, detach LBA data from an AU block when reading with LBA extraction (AUX_D_CMP is clear), or compare LBA data with that detached from an AU block when reading with LBA comparison (AUX_D_CMP is set). In addition to LBA, other auxiliary data may cooperate with an AU block using the AUX FIFO 2015.

When the firmware 204 writes data to a flash device, the firmware 204 may be responsible for putting enough AUX data into the AUX FIFO 2015 to avoid ECC stalling. During the ECC processing, the ECC 2011 may request LBA data as well as AUX data from the AUX FIFO 2015 and the corresponding LBA data may be attached to an AU block and stored into a flash device.

When the firmware 204 reads data from a flash device, the behavior of the AUX FIFO 2015 may be different according to the AUX_D_CMP register bit. When AUX_D_CMP is clear (LBA extraction), the AUX FIFO 2015 may be filled with LBA/AUX data detached from an AU block by the sequencer 2014. Whenever the ECC 2011 processes an AU block, corresponding LBA data may be transferred to the sequencer and stored into the AUX FIFO 2015. The firmware 204 may determine which logical area the AU block belongs to by reading the LBA data from the AUX FIFO 2015. On the other hand, the LBA/AUX data may be retrieved from the AUX FIFO 2015 and delivered to the ECC 2011 when the register bit AUX_D_CMP is set (LBA extraction). This data may be compared with the LBA information detached from an AU block to determine that a correct AU block was processed.

Similarly to the track boundary in the physical domain, there may be a block boundary in the logical domain. Since one block size is 32 k-byte, one full block consists of 8 AUs, for an AU size of 4 k-byte. It is possible that the firmware 204 may read one whole block (Full Reading) or some portion of one block (Partial Reading).

When a column parity option is set, the ECC 2011 may perform column encoding/decoding at the block boundary.

2.2 Sequencer FIFO Operation

As shown in FIG. 3, the sequencer 2014 may be located between the firmware 204 and the ECC (RS/BCH) 2011, the formatter 2012, and the flash I/F controller 2013. The sequencer 2014 may handle all communications therebetween. In other words, the firmware 204 only interacts with the sequencer 2014 through descriptors, AUX data and interrupts. The flash I/F controller 2013 may be in a sequencer mode, an indirect mode, or a direct mode.

When the flash I/F controller 2013 is configured to be in the sequencer mode, the sequencer 2014 may support the following commands/operations: ERASE, PROG, and READ. There are other commands which are supported by the flash I/F controller 2013 in the indirect mode and direct mode. In the indirect mode, the firmware may issue any command bytes to device without using the sequencer, which gives more flexibility on controlling the memory devices. In the direct mode, the firmware 204 may be responsible for programming necessary registers in the flash I/F controller 2013 (e.g., configuration, triggering and checking status), and the sequencer 2014 is not involved. Each register bit corresponds to each flash memory device control signal, so maximum flexibility is provided in direct mode.

The sequencer FIFOs may have the functions/responsibilities:

A. Providing physical descriptor FIFO and logical AUX FIFO to the firmware 204 (see "Physical Descriptor FIFO" in Section 2.2.1 and "Logical AUX FIFO" in Section 2.2.2).

B. Monitoring FIFOs and triggering operations in both the physical domain and the logical domain, collecting status from various blocks and interrupting the firmware 204 accordingly while the firmware is responsible for checking status registers in hardware blocks (see "Physical Descriptor FIFO" in Section 2.2.1 and "Logical AUX FIFO" on in Section 2.2.2).

C. Extracting Information from descriptors and passing to corresponding hardware blocks (see "Descriptors Handling" in Section 2.2.3).

2.2.1 Physical Descriptor FIFO

The physical descriptor FIFO 2016 may contain descriptor information in the physical domain, mainly for the flash I/F controller 2013. Two FIFO pointers—PHY_WR_PTR and PHY_RD_PTR—may be provided to the firmware 204 so that the firmware 204 may write data into and read data from the physical descriptor FIFO 2016. Another pointer PHY_EXE_PTR may be provided for the sequencer 2014 to dispatch descriptors from the physical descriptor FIFO 2016 and send them to flash I/F controller 2013. A pointer PHY_LTRK_PTR may be pointing at the first descriptor of the last completed track and used for error handling.

Figure 5:
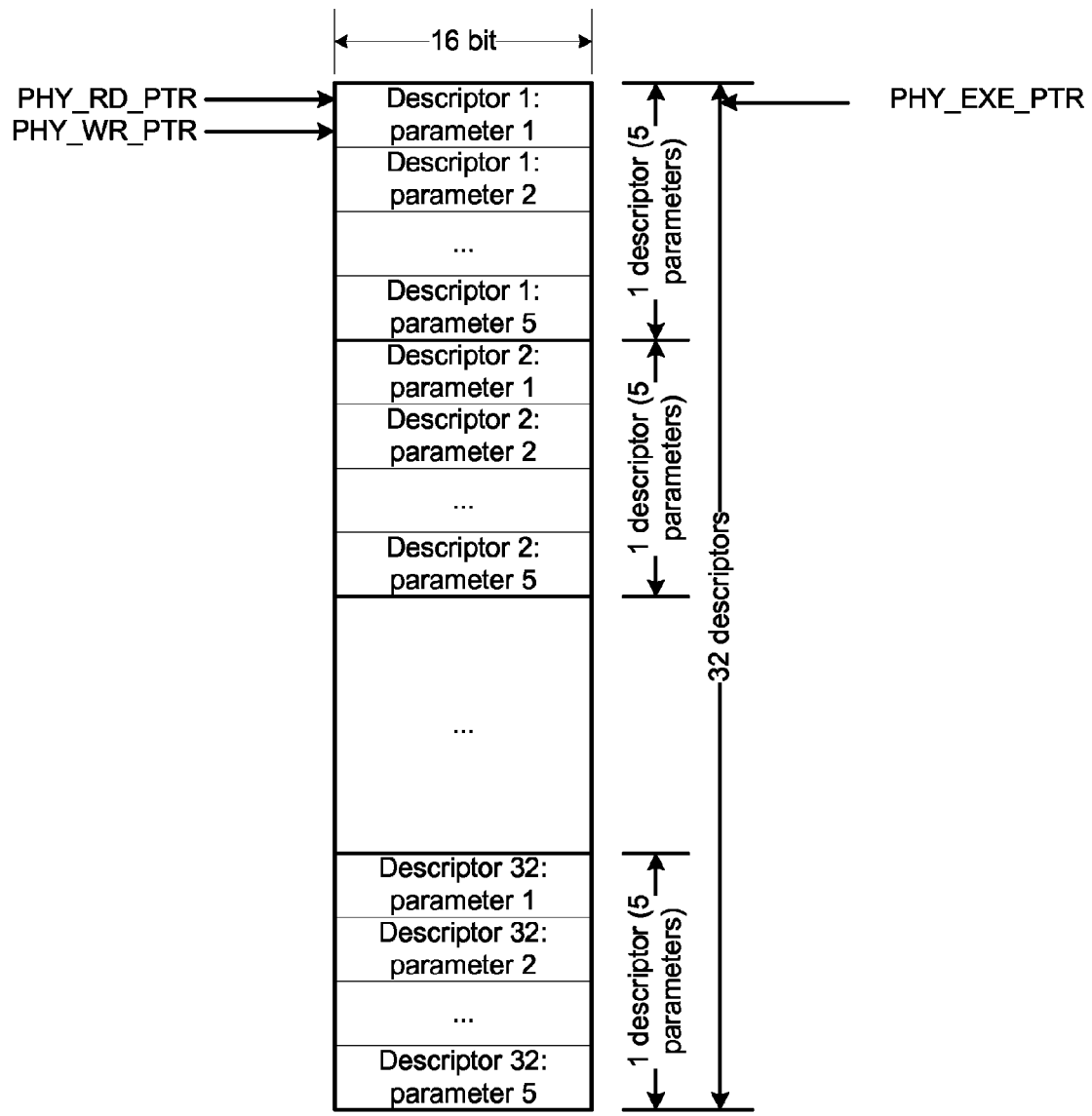
FIG. 5 illustrates the structure of physical descriptor first-in-first-out buffer (FIFO) 2016 according to one embodiment of the present invention.

FIG. 5 shows the structure of the physical descriptor FIFO 2016 which has 32 available descriptors and 5 parameters for each descriptor. Assuming that each single track has 16 descriptors, this physical descriptor FIFO 2016 may support up to two active tracks at the same time. If the size of a single track is smaller than 16 descriptors, the number of tracks that may reside in the physical descriptor FIFO 2016 may increase.

Both the firmware 204 and the sequencer 2014 may access the physical descriptor FIFO 2016. In order to support on-the-fly descriptor programming (in which the firmware 204 programs new descriptors while the sequencer 204 is in operation), a 2-port SRAM (SR2) may be used, and one port may be accessed by the firmware 204 and the other port may be accessed by the sequencer 2014.

Figure 6:
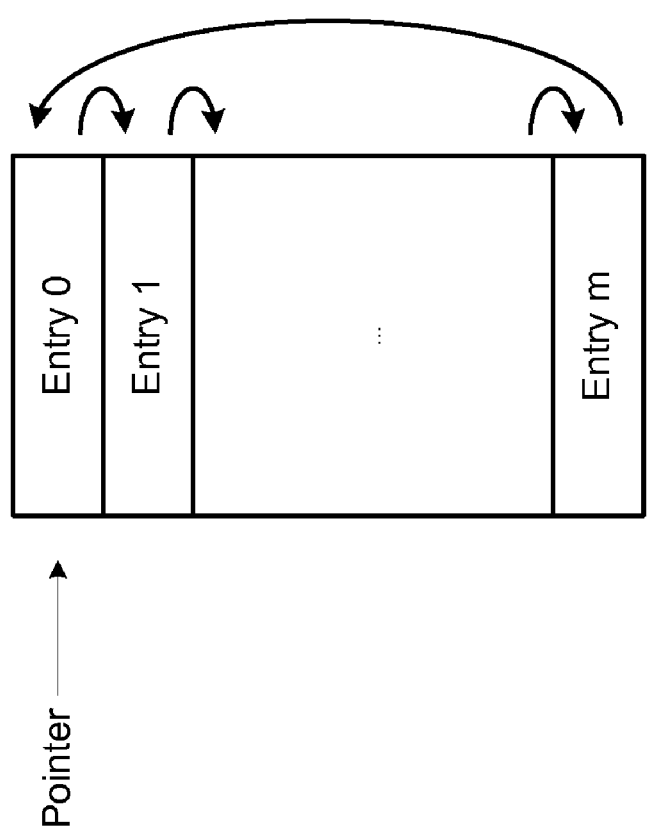
FIG. 6 illustrates a pointer of physical descriptor FIFO according to one embodiment of the present invention.

The physical descriptor FIFOs 2016 may be mapped into an RAB (Register Access Bus) space and several registers may be given to the firmware 204 to access the physical descriptor FIFO 2016 for read and write operations. To read from the physical descriptor FIFO 2016, the firmware 204 may program a PHY_RD_PTR and read FIFO data from PHY_RD_DATA. Similarly, the firmware 204 may write parameters into PHY_WR_DATA, so as to write descriptors into the physical descriptor FIFO 2016. As shown in FIG. 6, every pointer may move in an increasing way and move to the position 0 when it has reached to the bottom of the physical descriptor FIFO 2016 to support the circular operation.

2.2.1.2 Physical Descriptor FIFO Definitions

One descriptor may be composed of 5 sub parameters, hence a descriptor may be assumed invalid until all the parameters are written into the physical descriptor FIFO 2016. A locking mechanism between the firmware 204 and the sequencer 2014 may be provided by pointers and counters; and pointers and counters may not be increased until the last parameter is written. Table 2-1 below lists sub parameters in a descriptor and their definitions. The firmware 204 may write descriptors into the physical descriptor FIFO 2016 by writing to PHY_WR_DATA in the following order.

1. FC_XF_COUNT[15:0]
2. FC_START_COL_ADDR[15:0]
3. FC_START_ROW_ADDR[15:0]
4. {FC_CH_NUM[3:0], FC_DES_TYPE[3:0], FC_START_ROW_ADDR[23:16]}
5. {FC_DEV_NUM[7:0], 7'b0, TRACK}

TABLE 2-1

Physical Descriptor Format

| Parameters | Bit | Descriptions | ERASE | PROG | READ |
|---|---|---|---|---|---|
| FC_XF_COUNT | 16 | Flash controller transfer count READ mode: number of bytes (or cells in NAND Flash) to be read. WRITE mode: number of bytes (or cells in NAND Flash) to be written. ERASE mode: number of blocks to be erased. | Y | Y | Y |
| FC_START_COL_ADDR | 16 | Flash controller start column address specifies the physical start column address. In case of row and column addresses are not supported, {row_addr, column-addr} is treated as plain address. | Y | Y | Y |
| FC_START_ROW_ADDR | 16 | Flash controller start row address specifies the physical start row address. | Y | Y | Y |
| FC_CH_NUM | 4 | Flash controller channel number specifies which channel to be accessed. | Y | Y | Y |

TABLE 2-1-continued

Physical Descriptor Format

| Parameters | Bit | Descriptions | ERASE | PROG | READ |
|---|---|---|---|---|---|
| FC_DES_TYPE | 4 | Flash controller job type<br>0000: READ<br>0001: PROG<br>0010: ERASE<br>All others: Reserved | Y | Y | Y |
| FC_DEV_NUM | 8 | Flash controller device number specifies which device to be accessed (note multiple devices per channel). | Y | Y | Y |
| TRACK | 1 | Track indicator indicates it is the last Descriptor of the current track. | Y | Y | Y |

Counters PHY_FIFO_CNT and PHY_DES_CNT may be automatically increased by 1 when the firmware 204 finishes writing one descriptor. When the firmware 204 writes one parameter of a descriptor, the pointer PHY_WR_PTR may be increased by 1 and ready for the next entry, and the firmware 204 may keep writing to PHY_WR_DATA to continue inserting subsequent parameters. The pointer PHY_WR_PTR may be increased by 5 when the firmware 204 finishes writing one descriptor since one descriptor consists of 5 parameters.

The counter PHY_FIFO_CNT indicates how many descriptors are in the descriptor FIFO 2016, including completed descriptors and pending descriptors. The descriptor FIFO 2016 eventually will fill unless the firmware clears completed descriptors and releases FIFO spaces. When the descriptor FIFO 2016 is full, new descriptor written by the firmware 204 may be ignored and a maskable DES_FIFO_OVERFLOW interrupt may be generated. The firmware 204 may maintain the descriptor FIFO 2016 by clearing descriptors and releasing FIFO spaces. After one track is completed and interrupt generated, the firmware 204 may read PHY_FIFO_CNT_CTRL to find out how many descriptors were completed in the last track, and then write a 2's complement value to PHY_FIFO_CNT_CTRL to release FIFO spaces. The counter PHY_FIFO_CNT may be decreased by the same amount.

The counter PHY_DES_CNT may indicate the number of descriptors waiting in the descriptor FIFO 2016 to be executed. It may be incremented (e.g. increased by one) when the firmware 204 writes a new descriptor, and decremented (e.g. decreased by one) when the sequencer 2014 executes one descriptor. The sequencer 2014 may start executing the next descriptor if the counter PHY_DES_CNT is not zero; stall when the counter PHY_DES_CNT reaches zero; and resume operation again when PHY_DES_CNT becomes non-zero by inserting new descriptors.

When the sequencer 2014 detects that there are descriptors in the descriptor FIFO 2016 by monitoring the counter PHY_DES_CNT, the sequencer 2014 may start dispatching parameters at the position of PHY_EXE_PTR one by one until all parameters are ready to be sent to the flash I/F controller 2013. PHY_EXE_PTR may be increased by 1 while the sequencer 2014 dispatches parameters.

The firmware 204 may examine the contents of the descriptor FIFO 2016 by reading data from PHY_RD_DATA which is pointed by PHY_RD_PTR. PHY_RD_PTR may be increased by 1 when the firmware 204 reads one parameter from the descriptor FIFO 2016.

2.2.1.3 Descriptor FIFO Operation

Figure 7A:
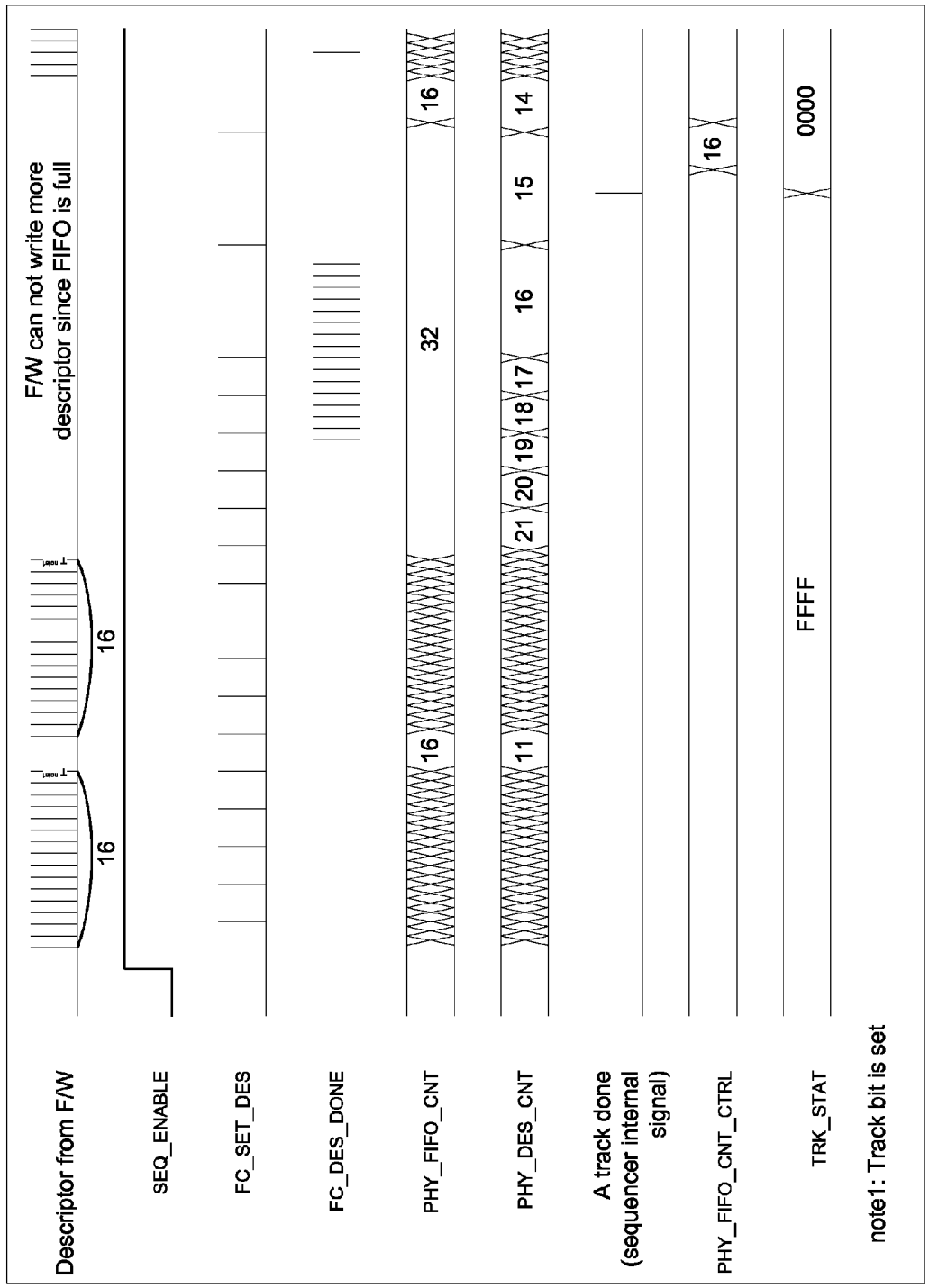
FIG. 7A illustrates waveforms of physical descriptor FIFO operation in a normal situation according to one embodiment of the present invention.
Figure 7B:
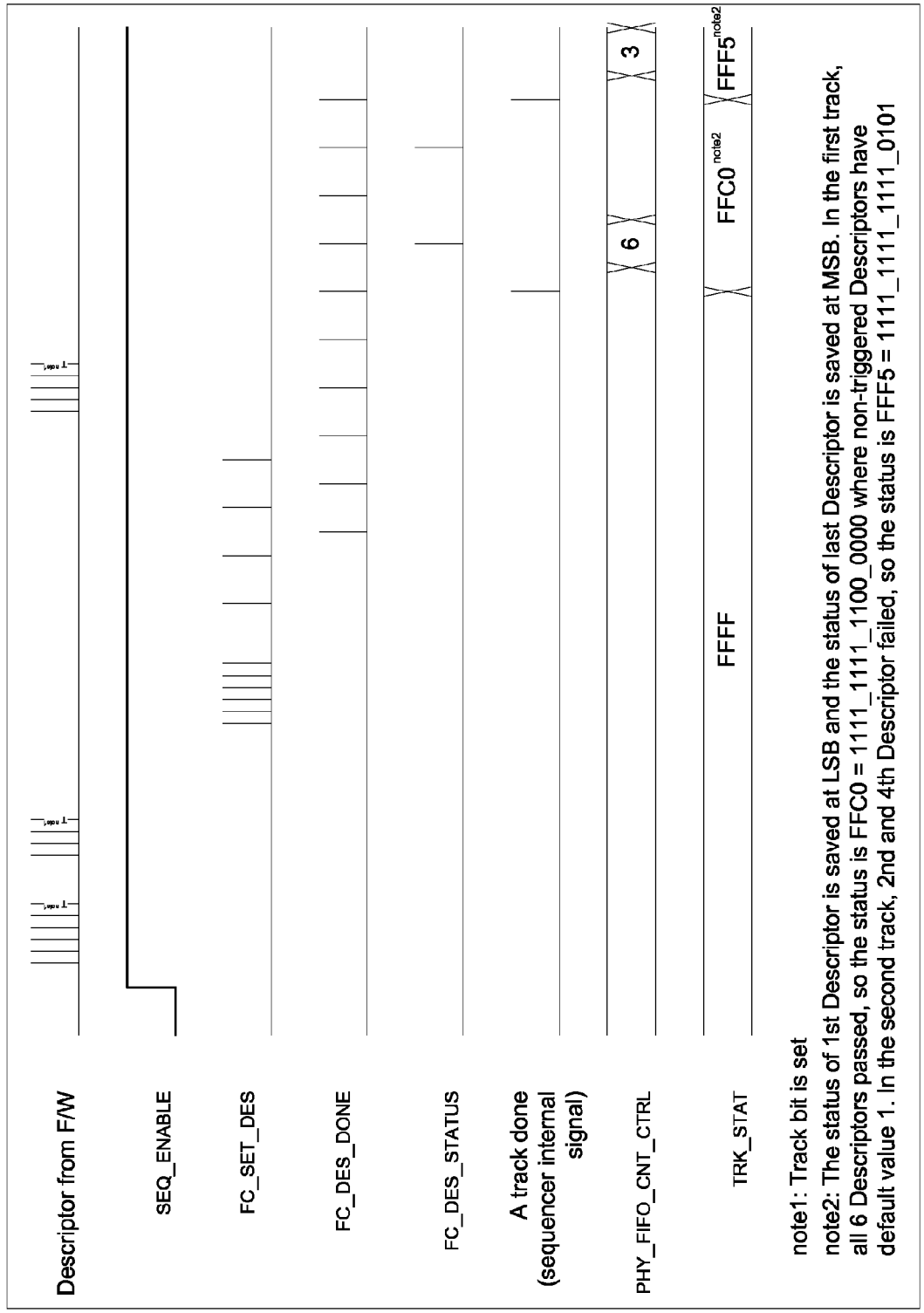
FIG. 7B illustrates waveforms of physical descriptor FIFO operation in an error situation according to one embodiment of the present invention.

FIG. 7A illustrates waveforms of the descriptor FIFO operation in a normal situation according to one embodiment of the present invention, and FIG. 7B illustrates waveforms of the descriptor FIFO operation in an error situation according to one embodiment of the present invention.

Once SEQ_ENABLE is set, the sequencer 2014 may execute descriptors in the same order in which they are programmed (the first one is pointed by PHY_EXE_PTR). The sequencer 2014 may keep sending descriptors to the flash I/F controller 2013 when FC_RDY is set until the counter PHY_DES_CNT reaches zero or the number of active track reaches two (or the number configured at MAX_ACT_TRK by the firmware 204).

For status reporting, TRACK_DONE and TRACK_ERR may be configured as interrupts. Once a track is completed in the flash I/F controller 2013, and TRACK_DONE interrupt may be detected, the sequencer 2014 may generate an interrupt with corresponding status register TRK_STAT and PHY_LTRK_PTR is moved to the first descriptor of the completed track. TRK_STAT may be initialized to 'FFFF' assuming all the descriptors in the track are failed in default, and updated by FC_DES_DONE signal.

If necessary, the firmware 204 may look up the descriptors in the completed track by setting PHY_RD_PTR to the position of PHY LTRK_PTR and reading data from PHY_RD_DATA.

The firmware 204 may stop the operation of the sequencer 2014 any time by resetting SEQ_ENABLE. The ECC 2011 and the firmware 204 may be disabled, and signal may be sent to the flash I/F controller 2013 to abort any pending job in flash I/F controller 2013.

2.2.2 Logical AUX FIFO

In order to provide more data structure flexibility, the size of the AU may be defined differently from the size of a physical page of the flash device. In other words, the logical domain does not necessarily align with the physical domain and the mapping between an LBA and a physical block address (PBA) is not one-to-one. As a result, a logical AUX FIFO 2015 may be needed to store LBA data as well as AUX data to perform a non-aligned data transfer.

2.2.2.1 Structure of AUX FIFO

Figure 8:
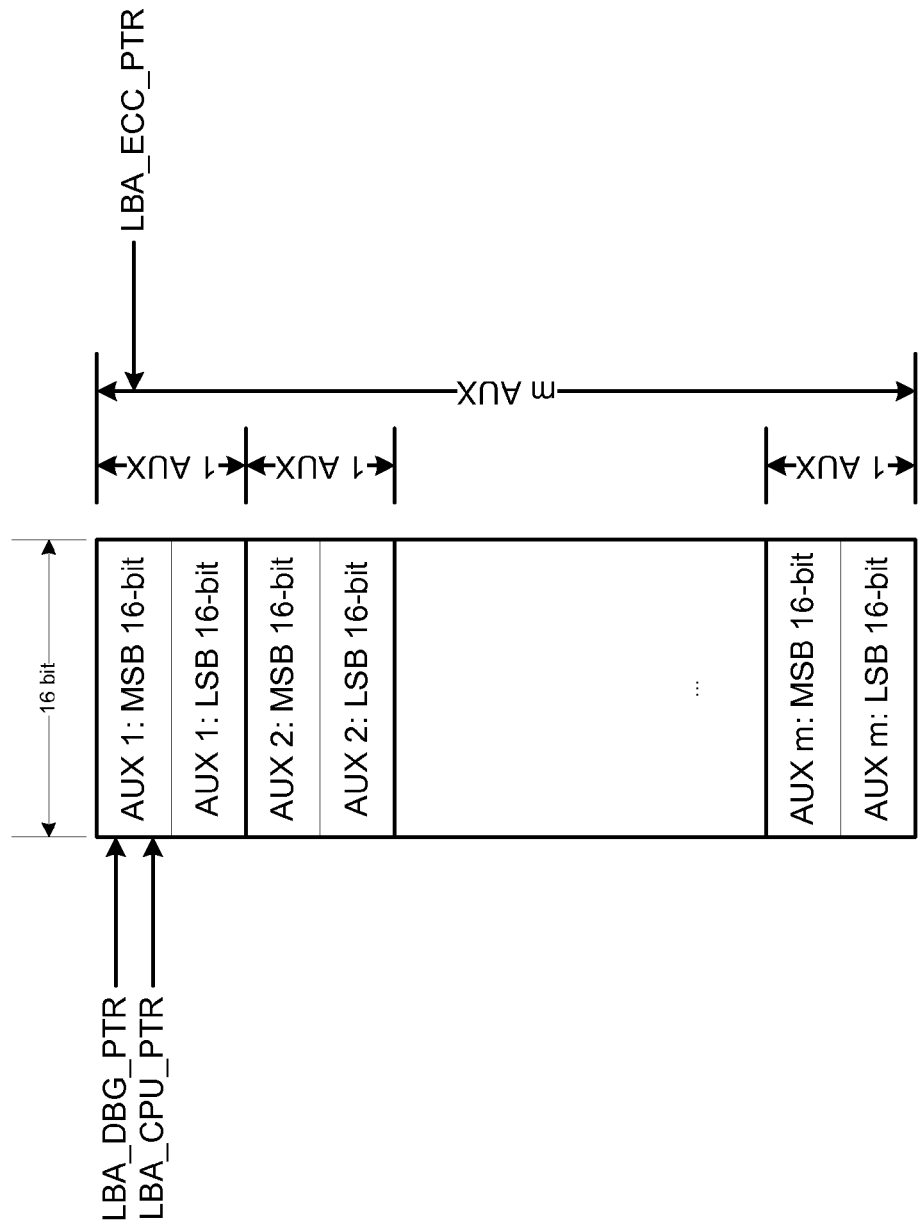
FIG. 8 illustrates the structure of the AUX FIFO 2015 according to one embodiment of the present invention.

FIG. 8 illustrates the structure of the AUX FIFO 2015 according to one embodiment of the present invention. The AUX_D_MODE may be set to 2 or 3 and one AUX data may consist of 2 FIFO entries. If AUX_D_MODE is set to 1, each AUX data may consist of one FIFO entry.

Since both the firmware 204 and the sequencer 2014 may access the AUX FIFO 2015, the AUX FIFO 2015 may use a 2-port SRAM (SR2) to support on-the-fly programming as in the descriptor FIFO 2016, so that the firmware 204 may accesses through one port and the sequencer 2014 may access through the other port simultaneously.

There are three FIFO pointers—CPU_PTR for firmware read/write, ECC_PTR for ECC read/write, and AUX_DBG_PTR for debugging. Pointers may be hidden and the firmware 204 may not access those pointers except pointer AUX_DBG_PTR. Pointers may be increased by 1 whenever the firmware accesses the data corresponding to each pointer, and moved to position 0 when reach at the bottom of the AUX FIFO 2015 to support circular FIFO scheme as shown in FIG. 6.

The AUX FIFO 2015 may be also mapped into register access bus (RAB) space so that the firmware may write and read FIFO data by programming and reading registers. The firmware 204 may write AUX data into the AUX FIFO 2015 by writing data to AUX_WDATA, and read AUX data by reading AUX_RDATA. For debugging, the firmware may move a pointer AUX_DBG_PTR to a desired position and read AUX data from the AUX FIFO 2015 by reading AUX_DBG_DATA.

2.2.2.2 AUX FIFO Definitions

The definition of a single portion of AUX data may be different depending on the AUX_D_MODE register setting. When the AUX_D_MODE register is set to 1, one AUX data may correspond to one FIFO entry. On the other hand, if the AUX_D_MODE register is set to 2 or 3, one portion of AUX data may be composed of 2 FIFO entries. Accordingly, AUX data may be assumed invalid until both the MSB (most significant bit) and the LSB (least significant bit) are written into FIFO.

There may be an internal counter providing the locking mechanism which may be increased by 1 when one portion of AUX data are written into the AUX FIFO 2015 and decreased by 1 when AUX data is read from the AUX FIFO 2015. Similarly, the internal counter may detect overflow or underflow of the AUX FIFO 2015 and generate maskable AUX_FIFO_OVERFLOW and AUX_FIFO_UNDERFLOW interrupts for the firmware 204. The firmware 204 may clean-up the AUX FIFO 2015 and recover FIFO contents when overflow or underflow occurs.

Registers AUX_WDATA and AUX_RDATA may provide access to the AUX FIFO 2015. When the firmware writes data into the AUX FIFO 2015, the LBA data written to the AUX_WDATA register may be stored into the position of the AUX FIFO 2015 pointed to by the pointer CPU_PTR. The pointer CPU_PTR may be incremented (e.g. increased by one) when the firmware 204 writes one LBA data, hence the AUX FIFO 2015 may be ready to accept the next LBA data. The sequencer 2014 may retrieve the LBA data from the AUX FIFO 2015 by using the pointer ECC_PTR which is dedicated to the ECC module. On the other hand, when the firmware 204 reads data from the AUX FIFO 2015, the LBA data detached from the AU may be stored into the AUX FIFO 2015 at a location pointed to by ECC_PTR. The firmware 204 may read LBA data by reading AUX_RDATA. The pointer CPU_PTR may increment (e.g. increase by one) when the firmware reads data from AUX_RDATA.

The firmware may examine the content of the AUX FIFO 2015 by setting the pointer AUX_DBG_PTR and reading data from AUX_DBG_DATA. The pointer AUX_DBG_PTR may be incremented (e.g. increased by one) when AUX_DBG_DATA is read.

2.2.2.3 AUX FIFO Operation

The purpose of the AUX FIFO 2015 is to support the LBA data and AUX data transaction with the ECC 2011 during a READ or PROG operation. During a PROG operation, the ECC 2011 may request LBA data (or AUX data) when a new AU is encoded. The sequencer 2014 may accept the ECC request by dispatching LBA data from the AUX FIFO 2015 and sending the LBA data to the ECC 2011. When data is processed for a READ operation, the ECC 2011 may detach LBA data from each AU, and send them to the sequencer 2014 (in LBA extraction mode) or compare them with provided LBA data (in LBA comparison mode). In an LBA extraction mode, the sequencer 2014 may store the LBA data into the AUX FIFO 2015, so that the firmware 204 may look up those data and determine which LBA area the particular AU belongs to.

If a mismatch between the LBA data from the AUX FIFO 2015 and the LBA data extracted from AU data is detected during a READ operation with LBA comparison, an EC_FAIL interrupt may be generated by the sequencer 2014. The firmware 204 may look up the status register of the ECC 2011 to determine which error has occurred.

FIGS. 9A, 9B, 9C and 9D illustrate the LBA data transferred through an interface between the sequencer 2014 and the ECC 2011.

The firmware 204 may be responsible for maintaining the AUX FIFO data. In a PROG operation or READ operation with LBA comparison, the firmware 204 may prepare all required LBA data ahead of time while being careful not to exceed the given AUX FIFO spaces. The ECC 2011 may not proceed with AU encoding unless corresponding LBA data is prepared in the AUX FIFO 2015.

Similarly, in a READ operation with LBA extraction, the firmware 204 may read LBA data from the AUX FIFO 2015 in time so that the pointer CPU_PTR keeps following the pointer ECC_PTR. If the firmware fails to read LBA data in time, the AUX FIFO 2015 may overflow and an AUX_FIFO_OVERFLOW interrupt may be generated.

2.2.3 Descriptor Handling

Since the firmware 204, the ECC 2011 and the flash I/F controller 2013 perform different functions, not all information provided in descriptors are relevant to all blocks. The sequencer 2014 may be supposed to extract relevant information and pass to corresponding blocks. Table 2-2 shows parsing information from the sequencer to various blocks.

TABLE 2-2

| Info | FM | ECC | FC |
| --- | --- | --- | --- |
| FC_XF_COUNT | X | X | O |
| FC_START_C_COL_ADDR | X | X | O |
| FC_START_ROW_ADDR | X | X | O |
| FC_DES_TYPE | X | X | O |
| FC_CH_NUM | X | X | O |
| FC_DEV_NUM | X | X | O |

2.3 Interface/Protocol Between Sequencer 2.3.1 Interface Between Sequencer and the Firmware The interface between the sequencer 2014 and firmware 204 may be best described by a set of programmable configuration registers and status registers specified in sequencer registers. The sequencer FIFO operation is described in Section 2.2 and the communication between the sequencer 2014 and the firmware 204 will be described in Section 2.5.1.

2.3.2 Interface Between Sequencer and FM

The interface/protocol between the sequencer 2014 and the firmware 204 is illustrated in Table 2-3.

TABLE 2-3

| Signal | Direction I: input to Sequencer; O: output from Sequencer. | Clock Domain | Descriptions |
|---|---|---|---|
| XO_SEQ_SRESET_N | O | ecc_clk | FM soft reset 1<br>Active-low reset for FM logic in ecc_clk domain (used to bring FM to initial status). This soft reset signals is shared with ECC. |
| FM_FC_SRESET_N | O | fc_clk | FM soft reset 2<br>Active-low reset for FM logic in fc_clk domain (used to bring FM to initial status). |
| FM_ENABLE | O | ecc_clk | FM enable<br>Indicates to enable FM logic when set (used as clock gating for FM block to save power). |

Note:
I: input to the sequencer,
O: output from the sequencer.

2.3.3 Interface Between Sequencer and ECC

ECC may not communicate directly with the AUX FIFO 2015; instead, the sequencer 2014 may read from the AUX FIFO 2015 and parse AUX data to the ECC 2011 through the interface described in Table 2-4.

TABLE 2-4

| Signal | Direction I: input to Sequencer; O: output from Sequencer. | Descriptions |
|---|---|---|
| XO_SEQ_SRESET_N | O | ECC soft reset<br>Active-low reset for ECC logic (used to bring ECC to initial status) as shown in Reset/Abort Scheme.. This soft reset signals is shared with FM. |
| XO_EC_ENABLE | O | ECC enable<br>Indicates to enable ECC logic when set (used as clock gating for ECC block to save power). |
| XO_START_AU | O | ECC block start<br>1T signal indicates the start of a ECC block (see ECC interface in PROG operation). |
| XO_LAST_AU | O | Last AU<br>Indicates XO_START_AU is for last AU of current operation. |
| XO_DEC0_ENC1 | O | ECC read/write direction<br>0: READ<br>1: PROG<br>Value is fixed during XO_EC_ENABLE is set. |
| XI_AU_RCV_DONE | I | ECC AU receive done<br>1T signal indicates AU is received from Host when writing and from FC when reading. |
| XI_AU_DONE | I | AU correction done<br>1T signal indicates AU correction is done which is generated after ECC row decoding (or column decoding if required) finishes. Sequencer decrements AU_LOOP_CNT when set in no error case. |
| XI_DEC_FAIL | I | AU correction failed<br>1T signal indicates AU correction is failed and uncorrectable, generated after ECC row decoding (or column decoding if required) finishes. |
| XI_EC_LBA_DATA[31:0] | I | ECC LBA data<br>32-bit LBA data detached from AU by ECC and transferred to Sequencer during read mode with LBA extraction. |
| XO_SEQ_LBA_DATA[31:0] | O | Sequencer LBA data<br>32-bit LBA data fetched from AUX FIFO and transferred to ECC during write mode or read mode with LBA comparison. |

TABLE 2-4-continued

| Signal | Direction I: input to Sequencer; O: output from Sequencer. | Descriptions |
|---|---|---|
| XO_AUX_D_CMP | O | Auxiliary data compare<br>Determine the mode between LBA comparison and LBA extraction during READ operation. This signal is controlled by AUX_D_CMP.<br>0: ECC writes the extracted AUX data to the AUX FIFO in Sequencer.<br>1: ECC reads AUX data from AUX FIFO in Sequencer and compare it with the AUX data extracted from the decoded AU, and declares failure if mismatch detected. |
| SO_AUX_D_MODE | O | Auxiliary data mode<br>Choose how much auxiliary data to pad to the end of AU before sending data to encoder. This signal is controlled by AUX_D_MODE.<br>0: No auxiliary data.<br>1: 2 bytes of auxiliary data.<br>2: 3 bytes of auxiliary data.<br>3: 4 bytes of auxiliary data. |

Note:
I: input to the Sequencer;
O: output from the sequencer

Figure 9A:
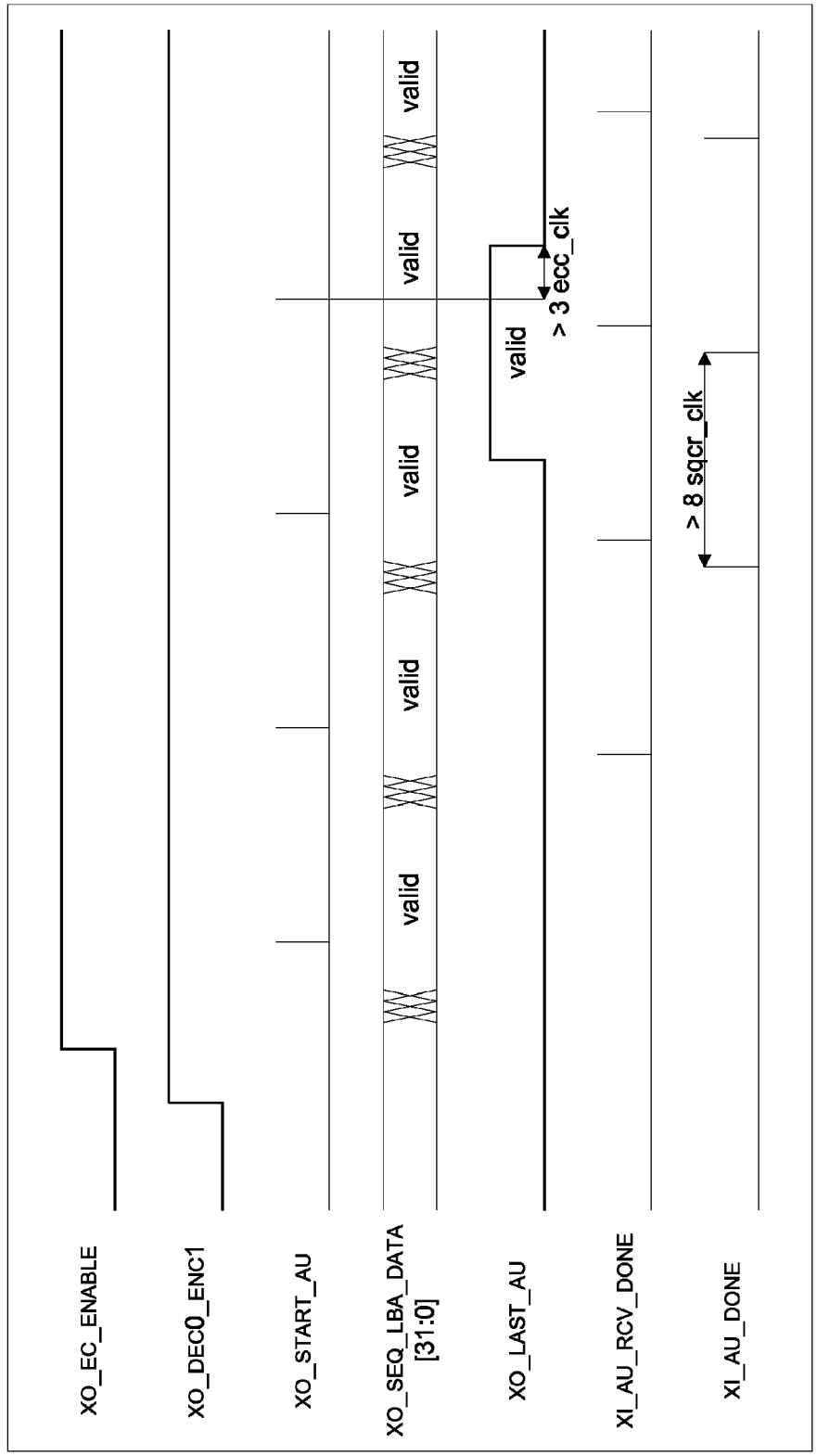
FIGS. 9A, 9B, 9C and 9D illustrate logical block address (LBA) data transferred through an interface between sequencer 2014 and ECC 2011.

FIG. 9A illustrates the timing of a PROG operation where 4 AU are processed and written to Flash devices. XO_DEC0_ENC1 may be asserted before the ECC 2011 is enabled by setting XO_EC_ENABLE. XO_SEQ_LBA_DATA[31:0] and XO_LAST_AU should be valid when XO_START_AU is asserted. Since AUs are processed sequentially, XO_START_AU may not be generated until XI_AU_RCV_DONE of the previous XO_START_AU is received from the ECC 2011.

Figure 9B:
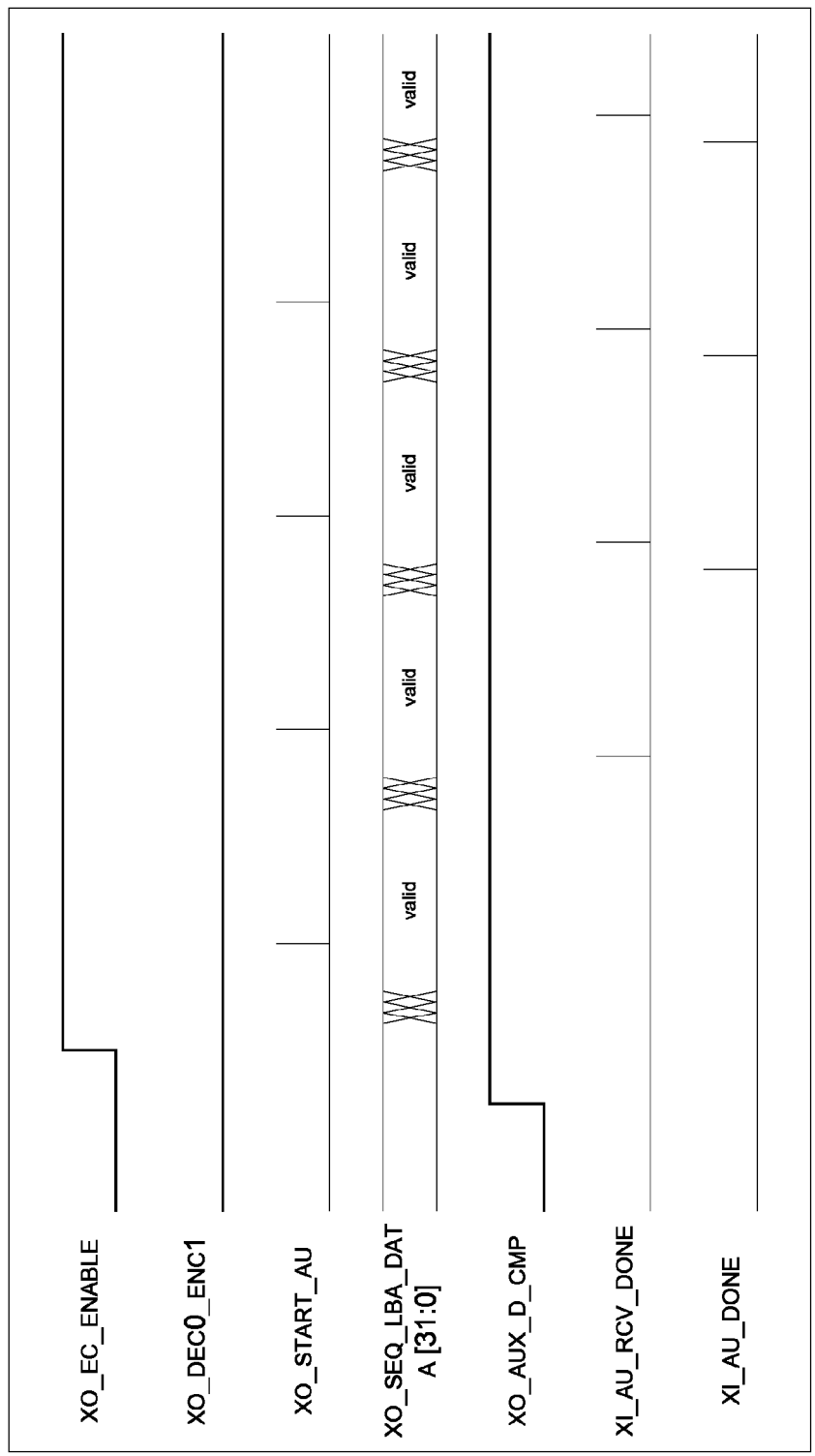

FIG. 9B illustrates waveforms of a READ operation with LBA comparison. The waveforms are similar to those of the PROG operation, because LBA (or AUX) data are fetched from the AUX FIFO 2015 and sent to the ECC 2011 to be compared with LBA data detached from an AU. Both XO_DEC0_ENC1 and XO_AUX_D_CMP are asserted before ECC is enabled by setting XO_EC_ENABLE.

Figure 9C:
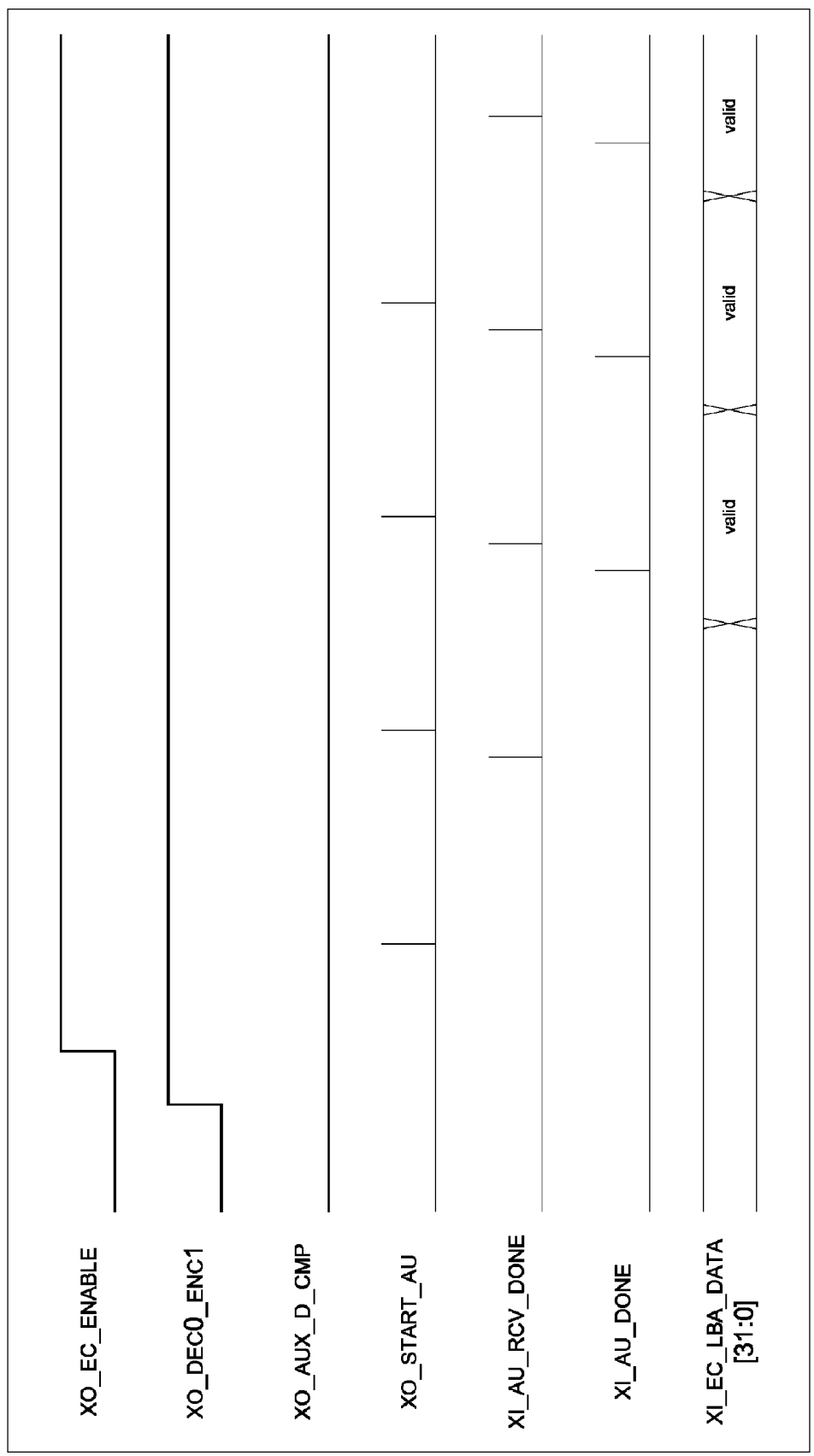

On the contrary, a READ operation with LBA extraction as shown in FIG. 9C may be different from the above two cases. In this case, LBA (or AUX) data may be extracted from an AU by the ECC 2011, and delivered to the sequencer 2014 along with XI_AU_DONE. XI_EC_LBA_DATA[31:0] should be valid when XI_AU_DONE is set so that the sequencer 2014 may latch the data. As in the READ operation with LBA comparison, both XO_DEC0_ENC1 and XO_AUX_D_CMP may be asserted before the ECC 2011 is enabled.

Figure 9D:
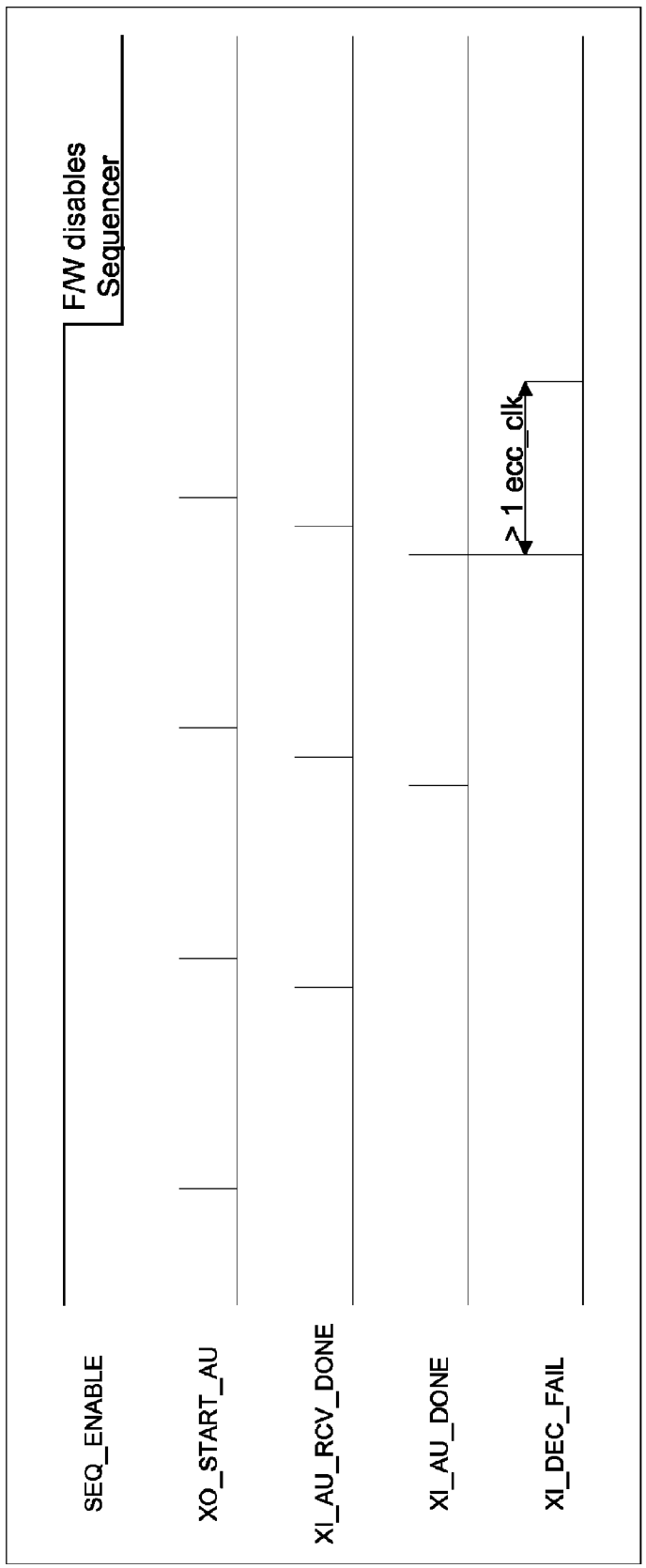

FIG. 9D illustrates waveforms when decoding fails and the ECC 2011 generates signals. Since XI_AU_DONE and XI_DEC_FAIL are mutually exclusive, XI_AU_DONE is not generated when XI_DEC_FAIL occurs. As soon as the firmware 204 detects an EC_FAIL interrupt, SEQ_ENABLE should be deasserted to abort/disable any pending operation in the sequencer 2014, ECC 2011, formatter 2012 and flash I/F controller 2013. SEQ_ENABLE may not be automatically turned off. The firmware 204 may proceed to error handling described in Section 2.5.3.

2.3.4 Interface Between Sequencer and Flash I/F Controller

The flash I/F controller 2013 may not communicate directly with the descriptor FIFO 2016. Instead, the sequencer 2014 may read from the descriptor FIFO 2016 and parse all necessary information to the flash I/F controller 2013 through the interface described In Table 2-5.

TABLE 2-5

| Signal | Direction I: input to Sequencer; O: output from Sequencer. | Descriptions |
|---|---|---|
| FC_SET_DES | O | Flash Controller set Descriptor<br>5 $T_{FC}$ Signal indicates a Descriptor is available for execution. One Descriptor is chopped into 5 sub-parameters and sent to FC through FC_PARAM[15:0] for 5 clock cycles. |
| FC_PARAM[15:0] | O | Flash Controller Descriptor parameter<br>16-bit Descriptor parameters chopped from one 80-bit long Descriptor during 5 clock cycles FC_SET_DES signal. |
| FC_SEND_STATUS | O | Flash Controller send status<br>If set, indicates when Sequencer is ready to receive the status of a Descriptor from FC. |
| FC_RDY | I | Flash Controller ready<br>If set, indicates when FC is ready to accept a new Descriptor from Sequencer. In case of Abort, this signal indicates abort process is being executed in FC, and set when abort process is completed. |

TABLE 2-5-continued

| Signal | Direction I: input to Sequencer; O: output from Sequencer. | Descriptions |
|---|---|---|
| FC_DES_DONE | I | Flash Controller Descriptor done Indicates a Descriptor finishes (status is available at FC_DES_STATUS when set). |
| FC_DES_STATUS | I | Flash Controller Descriptor status Indicates the status of a Descriptor and valid when FC_DES_DONE is set 0: pass; 1: fail. |
| FC_DES_ABORT | O | Flash Controller abort request Request abort of all executing and pending Descriptors in FC. |

Note:
I: Input to the sequencer;
O: output from the sequencer

Moreover, the sequencer 2014 may not communicate directly with each channel. The flash I/F controller 2013 may extract FC_CH_NUM from a descriptor and direct it to the appropriate channel.

Since the descriptor bus of FC_PARAM[15:0] between the sequencer 2014 and the flash I/F controller 2013 is 16 bits wide while one descriptor is 80 bits long, a descriptor may be chopped into 5 sub-parameters and sent to the flash I/F controller 2013 for 5 fc_clk cycles. One embodiment of the parameter order is shown below.

A. 1st parameter[15:0] = FC_XF_CNT[15:0]
B. 2nd parameter[15:0] = FC_START_COL_ADDR[15:0]
C. 3rd parameter[15:0] = FC_START_ROW_ADDR[15:0]
D. 4th parameter[15:0] = {FC_CH_NUM[3:0], FC_DES_TYPE[3:0], FC_START_ROW_ADDR[23:16]}
E. 5th parameter[5:0] = (FC_DEV_NUM[7:0], FC_DES_ID[7:0]}

All interface signals may belong to a fc_clk domain. FC_DES_ID[7:0] may not be specified by the firmware 204, but may be assigned by the sequencer 2014 using PHY_EXE_PTR. It may be used in the flash I/F controller to distinguish between different descriptors.

Figure 10A:
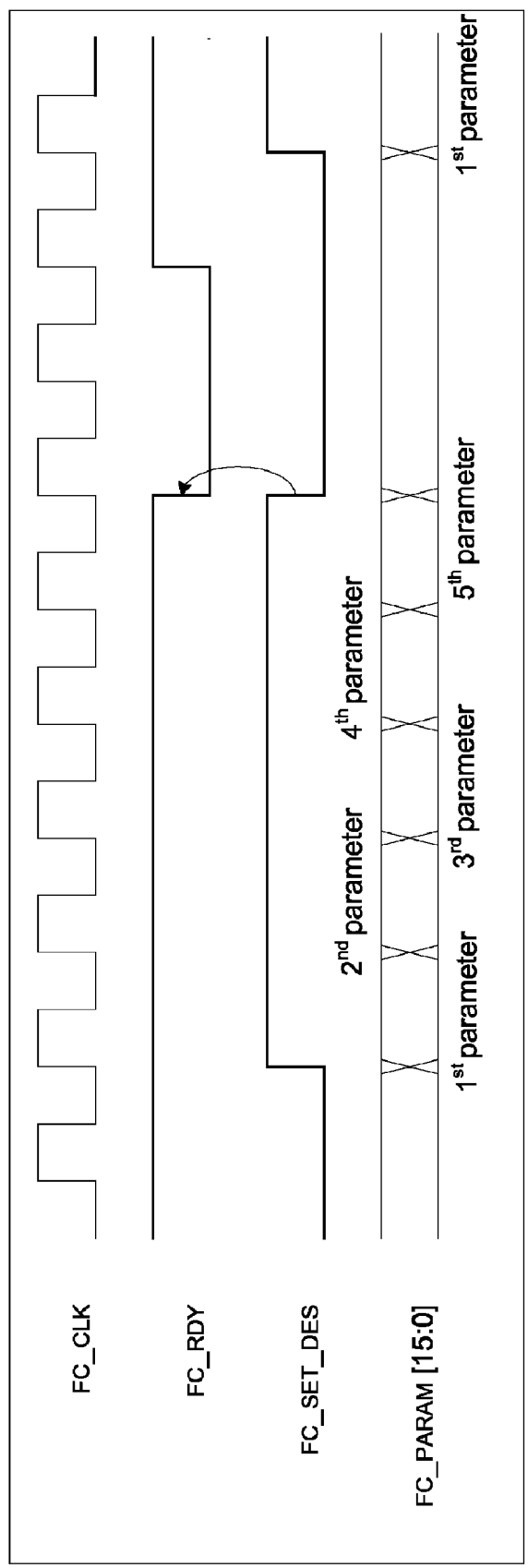
FIG. 10A illustrates waveforms at the interface between sequencer 2014 and flash I/F controller 2013.
Figure 10B:
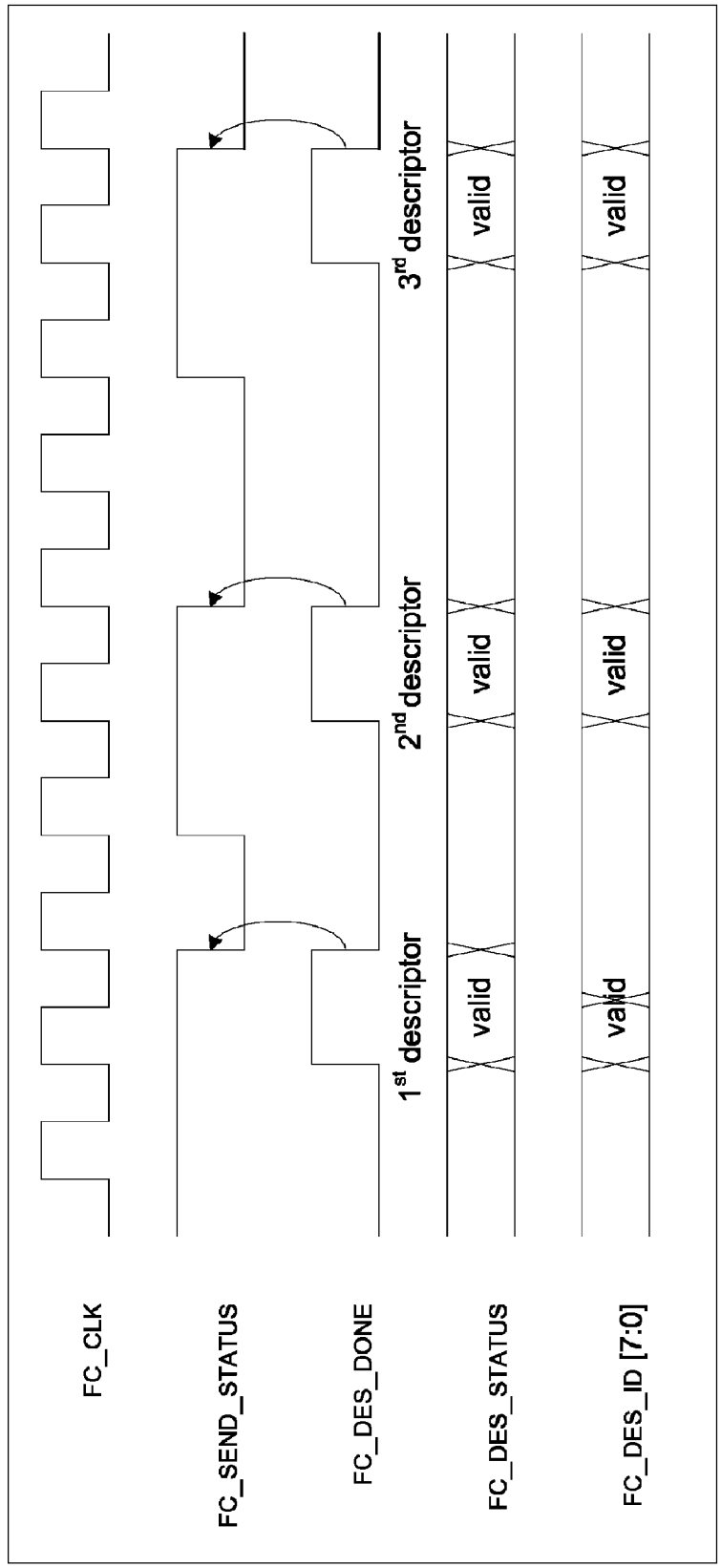
FIG. 10B illustrates the timing of status report from flash I/F controller 2013 according to one embodiment of the present invention.

FIG. 10A illustrates waveforms at the interface between the sequencer 2014 and the flash I/F controller 2013. As shown, a descriptor may be chopped into 5 sub parameters and transferred to the flash I/F controller 2013. FIG. 10B illustrates the timing of a status report from the flash I/F controller 2013. The flash I/F controller 2013 may report descriptor status in the same order in which the descriptors are received, which means no out-of-order status report is allowed. The FC_DES_ID[7:O] signal may be asserted along with FC_DES_DONE by the flash I/F controller 2013 to indicate the ID of completed descriptor, but the sequencer 2014 may not always need the information.

Figure 10C:
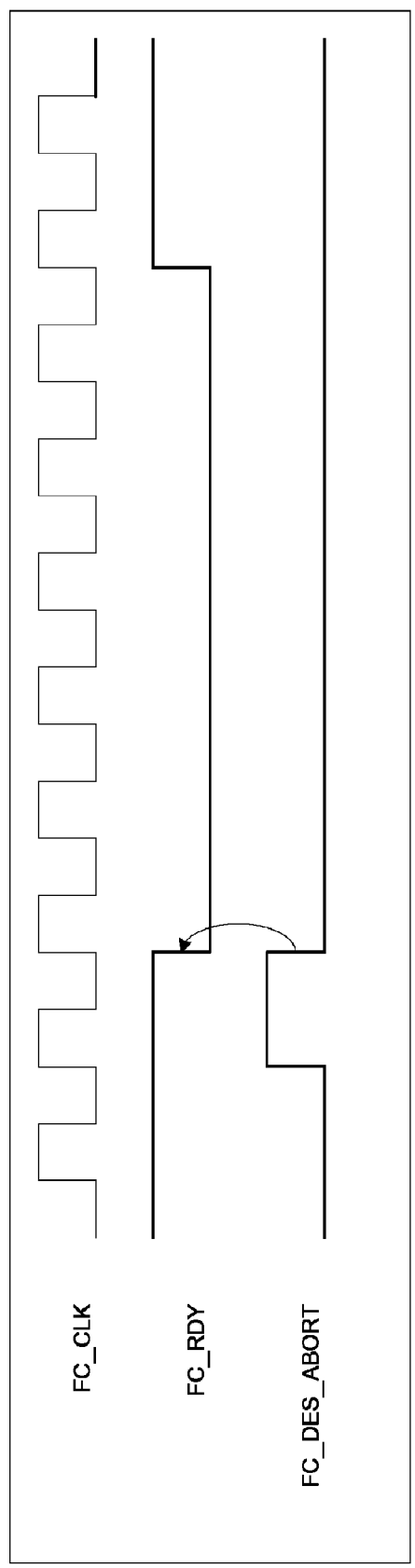
FIG. 10C illustrates the timings of the flash I/F controller abort request according to one embodiment of the present invention

FIG. 10C illustrates the timings of the flash I/F controller abort request.

2.4 Design Architecture of Sequencer

Figure 11:
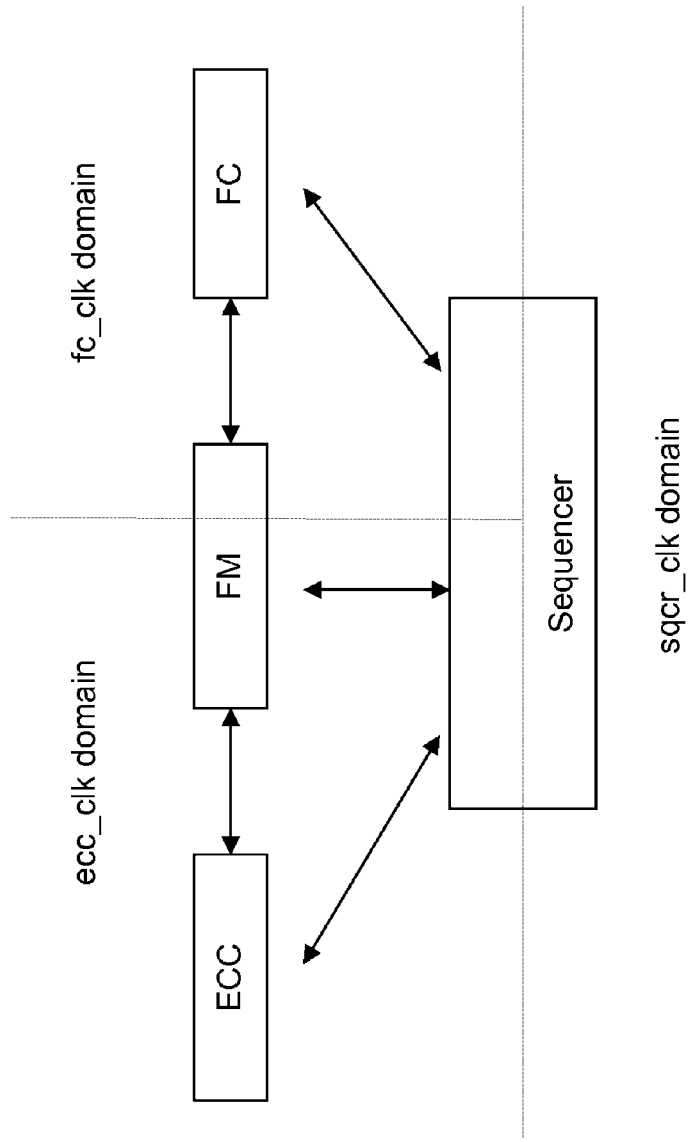
FIG. 11 illustrates a sequencer clock domain according to one embodiment of the present invention.

The sequencer 2014 may include memories for descriptor FIFO 2016 and AUX FIFO 2015, state machines to control physical and logical interfaces, and synchronization logic for interface between different clock domains, among other elements 2.4.1 Clock Scheme The sequencer 2014 may be fed with four different clock signals—rab_clk, sqcr_clk, fc_clk, and ecc_clk—to provide synchronized handshaking interface signals for the flash I/F controller 2013, the formatter 2012, and the ECC 2011. FIG. 11 illustrates a sequencer clock domain according to one embodiment of the present invention.

2.4.1.1 sqcr_clk

The clock sqcr_clk may be synchronous to rab_clk and may not require synchronization logic between the sqcr_clk domain and the rab_clk domain. All sequencer registers may be clocked by the clock signal rab_clk or sqcr_clk so that they may be read or written with the RAB bus. The sqcr_clk clock signal may have separate clock-enable logic from the rab_clk clock because they should be enabled independently—the clock sqcr_clk might be running while the clock rab_clk is disabled, or vice versa.

2.4.1.2 fc_clk

The fc_clk is the clock signal for the flash I/F controller 2013. One purpose of this clock signal is to support synchronization between the sequencer 2014 and the flash I/F controller 2013, mostly for the physical descriptor handshaking signal. When the sequencer 2014 issues a new descriptor to the flash I/F controller 2013, interface signals like FC_SET_DES or FC_SEND_STATUS may be generated in the sqcr_clk domain, but synchronized to fc_clk domain so that the flash I/F controller 2013 may communicate with the sequencer 2014 without synchronization on the side of the flash I/F controller 2013. Similarly, when the sequencer 2014 is receiving a descriptor status from the flash I/F controller 2013, the status and other signals may be delivered in the fc_clk domain and the sequencer 2014 may take care of synchronization issues.

Some of the signals like FC_PARAM[15:0] may be in the sqcr_clk domain even though they are consumed in the fc_clk domain, but it may be guaranteed by the sequencer 2014 that those signals are stable when being consumed by the flash I/F controller 2013.

All the fc_clk domain signals are connected to the flash I/F controller 2013 except for FM_FC_SRESET_N, which is connected to the formatter 2012 for the reset process.

2.4.1.3 ecc_clk

As physical descriptor-related signals are synchronized to the fc_clk domain, logical AUX data and its control signals may be synchronized by the clock ecc_clk to communicate with the ECC 2011. AUX data and handshaking signals may be generated in the sqcr_clk domain but synchronized to the ecc_clk domain before being transferred to the ECC 2011 when the AUX data is transferred to the ECC 2011, and they may be received in the ecc_clk domain and synchronized to the sqcr_clk domain when AUX data is received from the ECC 2011.

Some of the signals like XO_SEQ_LBA_DATA[31:0] may be in the sqcr_clk domain, but it may be guaranteed by the sequencer 2014 that those signals are stable when being consumed by the ECC 2011.

In addition to the ECC interface signals, FM_ENABLE signal for the firmware 204 may also be synchronized with the clock ecc_clk.

2.4.2 Memory Structure

Two 2-port SRAMs may be provided for the sequencer operation—one is for the physical descriptor FIFO 2015 and the other is for the logical AUX FIFO 2016. The firmware may read data from a FIFO or write data into a FIFO using one port while the sequencer 2014 may access data using the other port. The AUX FIFO 2015 may be utilized by the ECC 2011 while the descriptor FIFO 2016 may be used by the flash I/F controller 2013.

Each SRAM may have 16-bit data width and 160 data entries, resulting in a 320-byte SRAM memory size. A circular FIFO scheme may be used for the FIFOs so that data may be read or written in circular manner by rolling back the pointer to the top once it reaches to the bottom.

FIFOs may cooperate with their wrappers to control the FIFO data input/output operation. A FIFO wrapper may maintain a read/write pointer as well as a data count to indicate the number of data placed in the FIFO. However, a FIFO wrapper may not give protection for overflow or underflow, but simply may generate overflow/underflow interrupt to the firmware 204 as AUX_FIFO_UNDERFLOW, AUX_FIFO_OVERFLOW, and DES_FIFO_OVERFLOW while allowing data corruption. Hence the firmware 204 may take care to avoid data overflow/underflow in any case, and perform clean-up and recovery processes when those interrupts occur.

2.4.2.1 AUX FIFO

Figure 12:
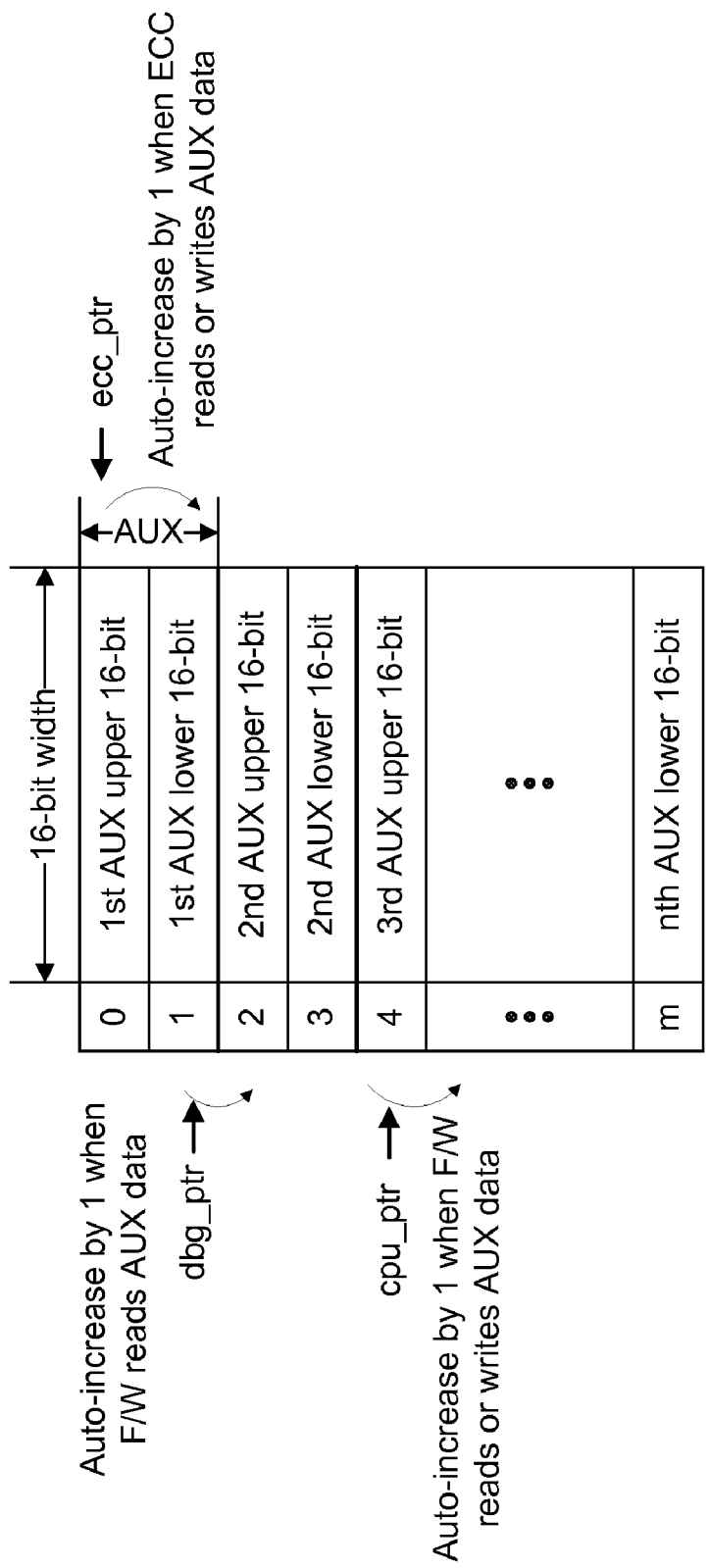
FIG. 12 illustrates an architecture of an AUX FIFO according to one embodiment of the present invention.

FIG. 12 illustrates an architecture of an AUX FIFO according to one embodiment of the present invention. As shown, an AUX FIFO 2015 may have three pointers—cpu_ptr, ecc_ptr, and dbg_ptr—and a counter aux_fifo_cnt.

The pointer cpu_ptr may be used by the firmware 204 for AUX data read/write. When the firmware 204 reads an AUX data with AUX_RDATA or writes an AUX data with AUX_WDATA, the pointer cpu_ptr may automatically increment (e.g. increase by one) and point to the next entry location, so that the firmware 204 does not have to control the pointer cpu_ptr by itself.

On the other hand, the pointer ecc_ptr may be used by the sequencer 2014 either to read AUX data and provide it to the ECC 2011 or to write AUX data transferred from the ECC 2011. The pointer ecc_ptr may also increment (e.g. increase by one) when the sequencer 2014 reads or writes one AUX data.

The pointer dbg_ptr may be used by the firmware to look up the contents of the FIFO data for debugging purposes. The firmware may arbitrarily move the pointer dbg_ptr by programming AUX_DBG_PTR, read data pointed by the pointer from AUX_DBG_DATA, and keep reading with dbg_ptr which is incremented (e.g. increased by one) automatically. The pointers cpu_ptr and ecc_ptr may be hidden to the firmware and only controlled by a sequencer logic while the pointer dbg_ptr is under the firmware control and can be moved as the firmware wants.

The counter aux_fifo_cnt may indicate the amount of AUX data in the AUX FIFO 2015. Since one portion of AUX data may consist of 2 FIFO data entries, the aux_fifo_cnt value may change when 2 FIFO entries (one AUX data) are pushed or popped. The aux_fifo_cnt value may increase or decrease depending on the different data mode—the firmware 204 may push AUX data into the AUX FIFO 2015 in write mode or read mode with the LBA comparison (AUX_D_CMP is set), and the sequencer 2014 may push AUX data into the AUX FIFO 2015 in read mode with LBA extraction (AUX_D_CMP is clear).

The mode is determined by the initial condition of whether the firmware 204 fills the AUX FIFO 2015 first or the sequencer 2014 fills the AUX FIFO 2015 first. When the AUX FIFO 2015 is empty (aux_fifo_cnt is 0) and the firmware starts filling the data into the AUX FIFO 2015, the mode is fixed to 'firmware pushing mode.' Afterward the pointer aux_fifo_cnt may increment (e.g. increase by one) when the firmware 204 pushes data and decrement (e.g. decrease by one) when the sequencer 2014 pops data. If the firmware 204 pops data or the sequencer 2014 pushes data in the 'firmware pushing mode,' the sequencer 2014 may malfunction.

Similarly, when the AUX FIFO 2015 is empty and the sequencer 2014 starts putting data into the AUX FIFO 2015, the mode may be set to 'firmware popping mode.' The counter aux_fifo_cnt may increment (e.g. increase by one) when the sequencer 2014 pushes AUX data and decrement (e.g. decrease by one) when the firmware 204 pops data. The mode may be released once the counter aux_fifo_cnt becomes 0 and can be set to the next mode depending on which one starts pushing data.

2.4.2.2 Descriptor FIFO

Figure 13:
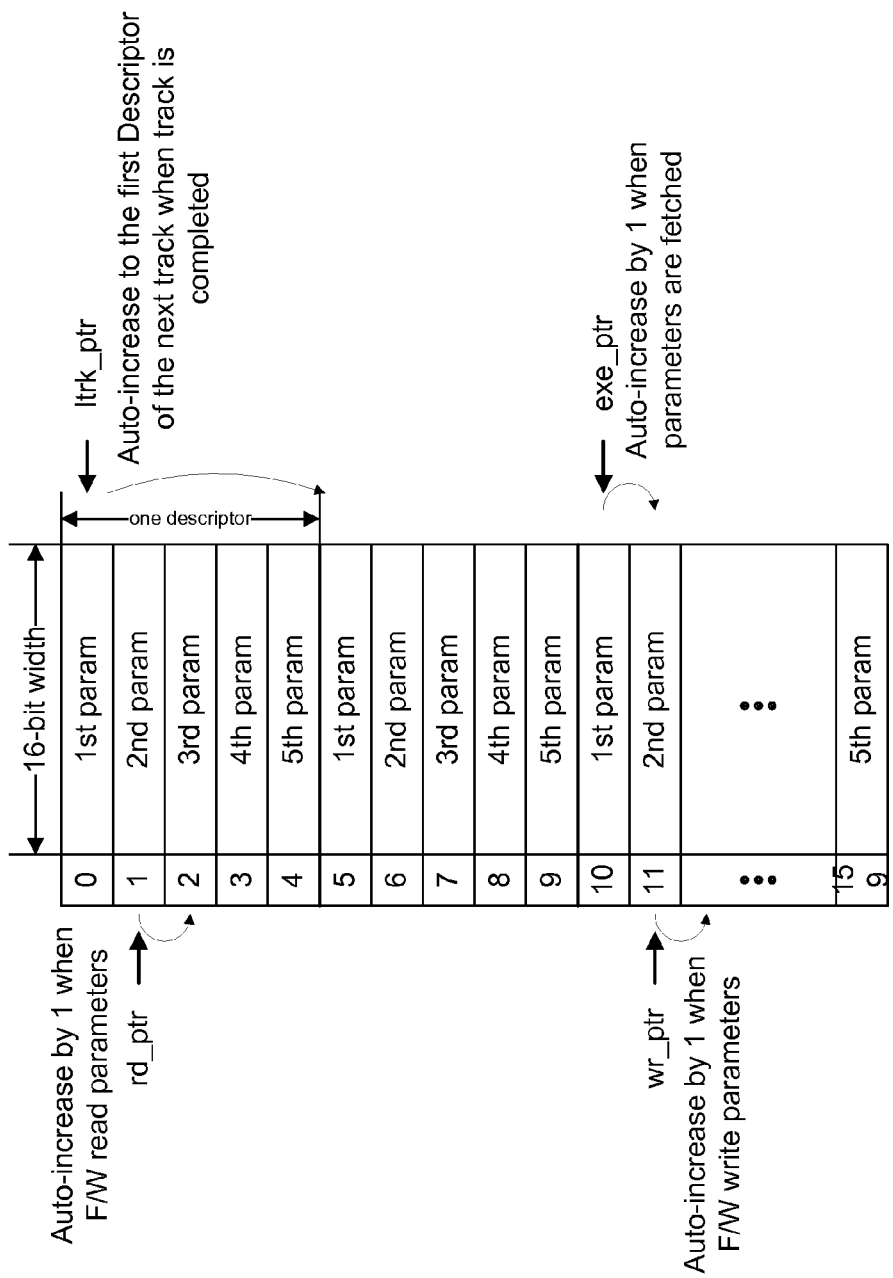
FIG. 13 illustrates the Descriptor FIFO pointers according to one embodiment of the present invention.

The descriptor FIFO 2016 may have 4 pointers: wr_ptr, rd_ptr, exe_ptr, and ltrk_ptr, and 2 counters—phy_fifo_cnt and phy_des_cnt. FIG. 13 illustrates the descriptor FIFO pointers according to one embodiment of the present invention.

The firmware 204 may write descriptors with the pointer wr_ptr and read descriptors with the pointer rd_ptr. Whenever the firmware 204 writes one parameter (one descriptor consists of 5 parameters) to PHY_WR_DATA, the pointer wr_ptr may increment (e.g. increase by one) and be ready to insert the next parameter. Also, when the firmware 204 reads one parameter from PHY_RD_DATA, the pointer rd_ptr may increment (e.g. increase by one) and point to the next parameter position to be read. Both wr_ptr and rd_ptr may be read by the firmware with PHY_WR_PTR and PHY_RD_PTR, but only rd_ptr may be moved by the firmware.

The pointer exe_ptr may be used by the sequencer 204 to fetch a descriptor and send it to the flash I/F controller 2013. During the descriptor transfer process, the sequencer 2014 may fetch 5 descriptor parameters from the descriptor FIFO 2016 and compose a full-length descriptor in temporary latches or flip-flops. Just like wr_ptr and rd_ptr, exe_ptr may increment (e.g. increase by one) automatically when the sequencer has fetched one parameter from FIFO. The pointer exe_ptr may also be visible to firmware with PHY_EXE_PTR.

The pointer ltrk_ptr may point to the first parameter of a first descriptor belonging to the most recently completed track. Hence this pointer may be moved to the next position whenever one track is completed. The firmware 204 may utilize this pointer when debugging by moving the rd_ptr to the same location as ltrk_ptr which can be read at PHY_LTRK_PTR.

The counter phy_des_cnt may indicate the number of 'remaining' descriptors in the descriptor FIFO 2016. Since one descriptor may consist of 5 FIFO data entries, the phy_des_cnt value may change when 5 parameters (one descriptor) are pushed or popped. The counter phy_des_cnt may increment (e.g. increase by one) when the firmware 204 writes one descriptor, and decrement (e.g. decrease by one) when the sequencer 2014 fetches and sends one descriptor to the flash I/F controller 2013. The firmware may read phy_des_cnt value with the counter PHY_DES_CNT.

The counter phy_fifo_cnt may indicate the number of all descriptors in the descriptor FIFO 2016, including completed ones. It may increment (e.g. increase by one) automatically when the firmware 204 pushes one descriptor into the descriptor FIFO 2016, but it may not decrement unless the firmware 204 manually decreases the counter. Once a track is completed in the flash I/F controller 2013 and TRACK_DONE interrupt is generated, the firmware may decrement the counter PHY_FIFO_CNT by the number of descriptors in the completed track. The firmware may find out the number of descriptors in the most recently completed track by reading the counter PHY_FIFO_CNT_CTRL, and may apply the negated number to decrement PHY_FIFO_CNT by the same amount. Descriptor FIFO overflow interrupts may be invoked by phy_fifo_cnt, not by phy_des_cnt.

2.4.3 Reset/Abort Scheme

In three different situations, the sequencer 2014 may perform a soft-reset and reset/disable the ECC 2011, the formatter 2012, or the flash I/F controller 2013. The reset/abort behaviors and protocols between the modules may depend on real time circumstance, but configuration register and status register values may remain the same so that the firmware does not need to reprogram those values for a new operation. Three different situations for reset/abort and corresponding behavior are shown below.

2.4.3.1 When SEQ_ENABLE Register Bit is Turned on

When the firmware writes a 1 to the SEQ_ENABLE register bit to start the sequencer operation, the sequencer 2014 may reset itself and other sub modules (the ECC 2011, the formatter 2012 and the flash I/F controller 2013) to clear them. The sequencer 2014 may be guaranteed to start a new operation in a clean and known status by resetting everything at the beginning of a new operation even if it was in erroneous or unknown status. As soon as SEQ_ENABLE is asserted, the sequencer 2014 may reset its state machines and all other logic like FIFOs or FIFO wrappers with only exception of configuration registers. Soft reset signals—XO_SEQ_SRESET_N and FM_FC_SRESET_N—may also be asserted to the ECC 2011 and the formatter 2012 to reset their status and may be kept high during reset process, and FC_DES_ABORT may be sent to the flash I/F controller 2013 to abort any pending jobs and clean up the status.

A SEQ_BUSY register bit may be set to indicate that the sequencer 2014 may be performing a reset operation and remain high until FC_RDY is set from the flash I/F controller 2013. The reset process may be assumed to continue until the flash I/F controller 2013 reset is completed since the flash I/F controller 2013 may take the longest time to reset its logic. Once FC_RDY is set by the flash I/F controller 2013, the soft reset signal to both the ECC 2011 and the formatter 2012 may be deasserted and the SEQ_BUSY register bit may go off. The firmware 204 may write descriptors and/or AUX data while SEQ_BUSY is set but the operation will not start until the SEQ_BUSY bit is turned off.

2.4.3.2 When SEQ_ENABLE Register Bit is Turned off

The firmware 204 may turn off an SEQ_ENABLE register bit when the operation is done (by receiving an OP_DONE interrupt) or when an error occurs. Both the physical state machine and the logical state machine may be reset to be in a clean state and disable the ECC 2011 and the formatter 2012. However, the FIFO and FIFO wrapper status are not reset and the firmware 204 may retrieve data and pointer information to perform the required investigation. The ECC 2011 and the formatter 2012 may be disabled but not reset, so their status may remain for the firmware. On the contrary, FC_DES_ABORT may be sent to the flash I/F controller 2013 to abort any pending job and clean-up the status, which means the flash I/F controller 2013 will not keep any status or information.

Similarly as when the SEQ_ENABLE bit is turned on, the SEQ_BUSY bit may be turned on when the FC_DES_ABORT bit is set and turned off when the FC_RDY bit is set again. The firmware 204 may not make any change except for the configuration registers of the sequencer 2014 when the SEQ_BUSY bit is turned on.

A track status register may be updated when the SEQ_ENABLE bit is turned off, and the firmware 204 may have current track status with the sequencer 2014 disabled by reading TRK_STAT. If the firmware 204 wants to check the status of the last completed track, TRK_STAT may be read before SEQ_ENABLE is turned off.

Figure 14:
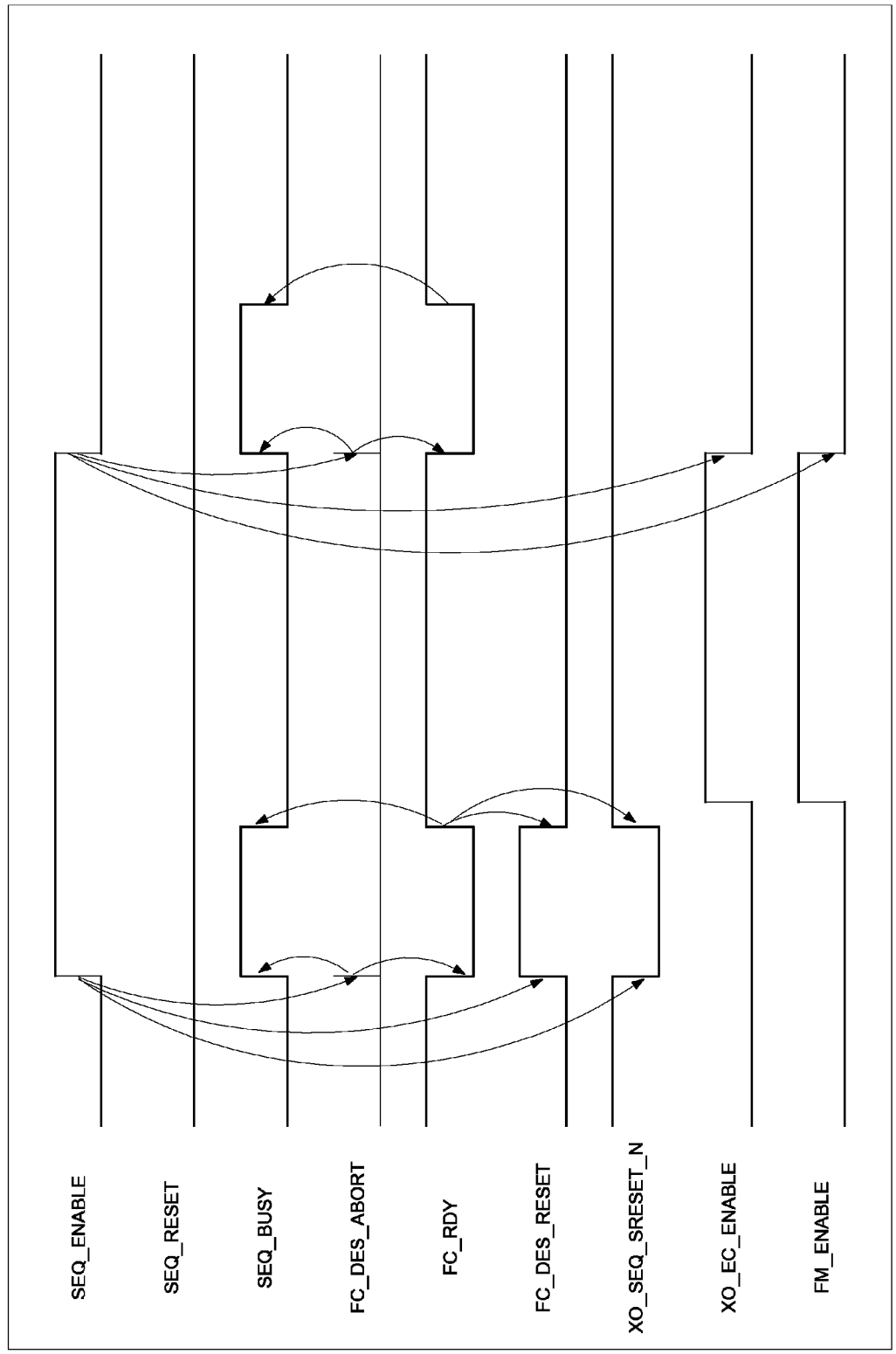
FIG. 14 illustrates the waveforms when SEQ_ENABLE assertion and deassertion control reset/abort/enable signals to sub modules according to one embodiment of the present invention.

FIG. 14 illustrates the waveforms when the SEQ_ENABLE assertion and deassertion control reset/abort/enable signals to sub modules.

2.4.3.3 When SEQ_RESET Register Bit is Set

When the firmware 204 writes 1 to an SEQ_RESET bit, all the information and status except configuration registers may be cleared up on the sequencer 2014, the ECC 2011, the formatter 2012 and the flash I/F control 2013 and they will be in initial status. The sequencer 2014 may reset all the logic including FIFOs, FIFO wrappers and state machines and send soft reset signals—XO_SEQ_SRESET_N and FM_FC_SRESET_N—to the ECC 2011 and the formatter 2012. The soft reset signal for the ECC 2011 and the formatter 2012 may be kept high until the reset process is completed. An FC_DES_ABORT may also be sent to the flash I/F controller 2013 to abort pending jobs. The SEQ_BUSY register bit may be turned on during the whole reset process and turned off when FC_RDY is set by the flash I/F controller 2013. The firmware 204 may wait until the SEQ_BUSY bit is turned off before resuming any operation.

An SEQ_ENABLE bit is turned off if it was on previously, and the SEQ_RESET bit may also be turned off automatically at the next clock cycle.

Figure 15:
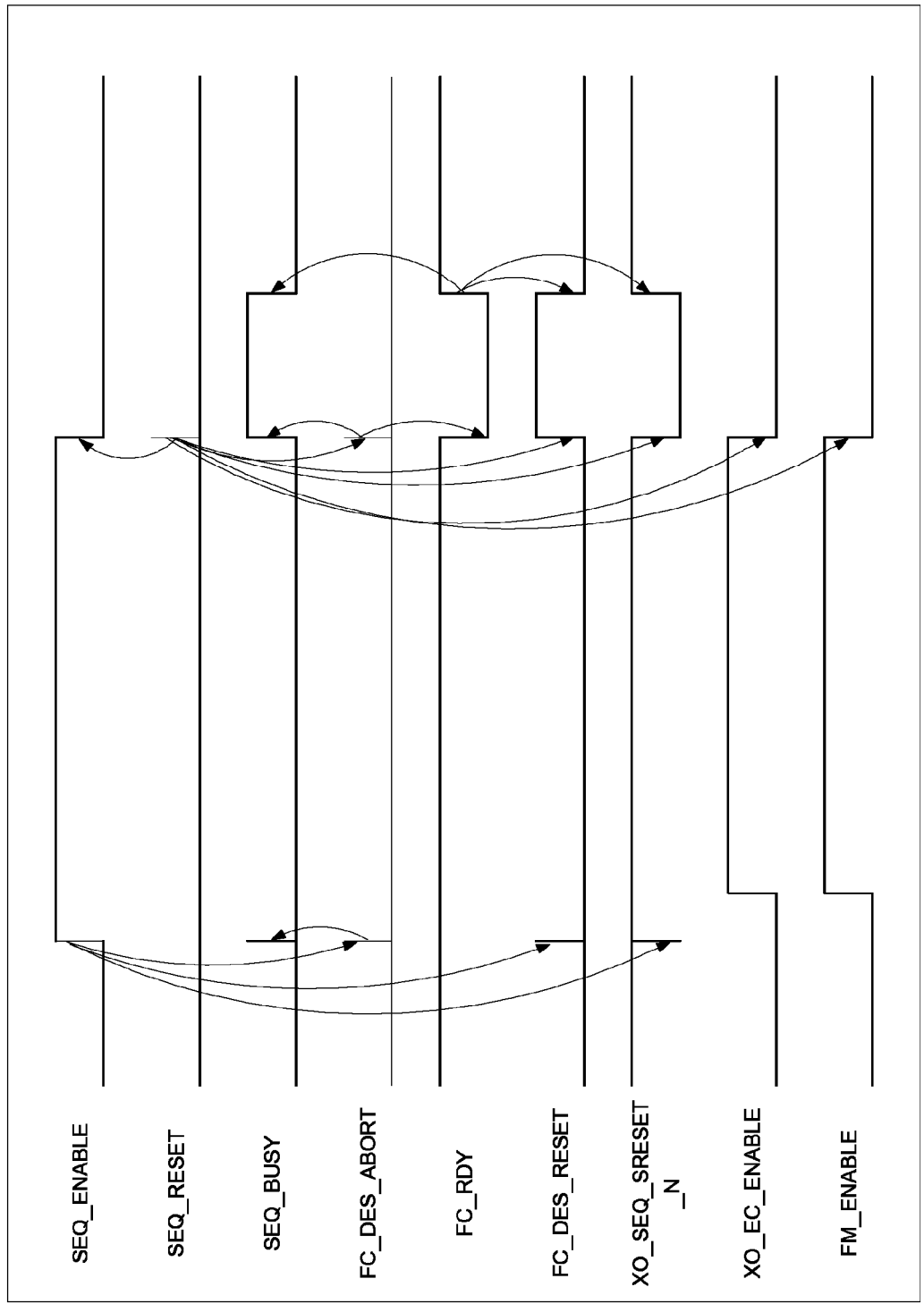
FIG. 15 illustrates the waveforms when the SEQ_RESET bit is asserted and how reset/abort/enable signals to sub modules are affected.

FIG. 15 illustrates the waveforms when the SEQ_RESET bit is asserted and shows how the reset/abort/enable signals to sub modules are affected. In this example, the flash I/F controller 2013 is in idle state so FC_RDY may not go down and the sequencer reset may take shorter time when SEQ_ENABLE is asserted.

2.4.4 Data Flow

The sequencer 2014 may not be directly related to the user data flow between the host 102 and Flash devices, but it may have its own data flow to control sub modules—especially the ECC 2011 and the flash I/F controller 2013 as shown in FIG. 3. There may be two data paths: one is in the logical domain and the other is in the physical domain. Those two data paths may be independent of each other and may be controlled separately by the ECC interface signal (logical domain) or flash I/F controller interface signal (physical domain).

In the logical domain, AUX data may be transferred to/from the ECC 2011 to support logical address information or any auxiliary data related to an AU. The sequencer 2014 fetches AUX data from the AUX FIFO 2015 and sends them to the ECC 2011 along with XO_START_AU in write mode or read mode with LBA comparison (AUX_D_CMP is set). The next AUX data and XO_START_AU signal are sent to the ECC 2011 after XI_AU_RCV_DONE is received from the ECC 2011. Hence the XO_START_AU and XI_AU_RCV_DONE signals form a handshaking interface. The sequencer 2014 may continue sending AUX data until all the AUX data programmed in the AU_LOOP_CNT register are transferred to the ECC 2011.

In read mode with LBA extraction (AUX_D_CMP is set), AUX data extracted from AU block is received along with XI_AU_DONE. The sequencer 2014 may store received AUX data into the AUX FIFO 2015 and the firmware 204 may have the information by reading the AUX_RDATA register.

Similarly, descriptors may be transferred to the flash I/F controller in the physical domain and define operation of each Flash device. The flash I/F controller interface may also have a handshaking interface for sending descriptor and receiving status. The sequencer 2014 may check an FC_RDY signal from the flash I/F controller and send descriptor with FC_SET_DES signal. The FC_RDY may be set again for the sequencer 2014 to send the next descriptor. In the same way, the sequencer 2014 may set an FC_SEND_STATUS signal to allow the flash I/F controller 2013 to send the FC_DES_DONE and FC_DES_STATUS signals.

2.4.5 State Machine

Sequencer state machines may fall into two categories. AUX state machines may take care of ECC interface signals to control data flow in the logical domain, and PHY state machines may take care of flash I/F controller interface signals to control descriptor transfer to the flash I/F controller 2013. There may be two state machines in each domain since sending data and receiving data may occur simultaneously and separate state machines may be needed to control transmitting (TX)/receiving (RX). All the interface signals may be generated and consumed in the sqcr_clk domain regardless of their target or source clock domain, hence synchronization may be required after the signal generation (if the signals are transferred to sub modules) or before signal consumption (if the signals are transferred from sub modules).

Detailed Information for each state machine Is shown below.

2.4.5.1 Logical Domain State Machines

Logical domain interface signals may be controlled by two separate AUX state machines. A TX state machine may control AUX data transfer from the sequencer 2014 to the ECC 2011 as well as XO_START_AU and XI_AU_RCV_DONE signals. On the other hand, an RX state machine may control AUX data transfer from the ECC 2011 to the sequencer 2014 and XI_AU_DONE signal. Since they are controlled by independent state machines, XO_START_AU and XI_AU_DONE may be supported simultaneously.

Figure 16:
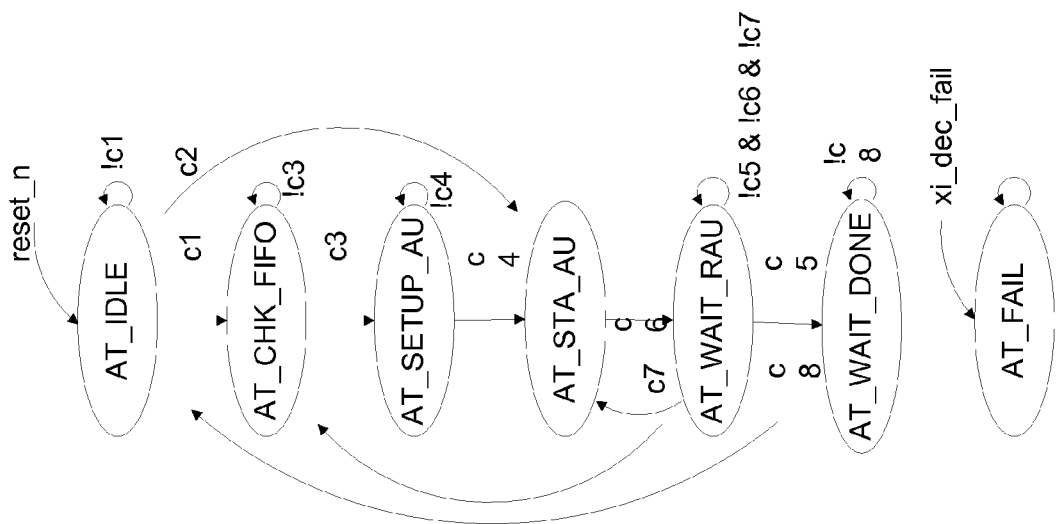
FIG. 16 illustrates detailed logical TX state machine diagrams including transition conditions and behaviors of each logical TX state machine according to one embodiment of the present invention.

FIG. 16 illustrates detailed state machine diagrams including transition conditions and behaviors of each state machine according to one embodiment of the present invention. As shown, the TX transition conditions may include:

c1: a first descriptor is fetched AND descriptor type is READ or PROG AND AUX_D_MODE is not 0 AND (write mode OR read mode with AUX comparison)

c2: a first descriptor is fetched AND descriptor type is READ or PROG AND (AUX_D_MDDE is 0 OR read mode with AUX extraction)

c3: AUX FIFO is not empty c4: required AUX data are fetched from FIFO c5: XI_AU_RCV_DONE is received AND all AUX data are sent c6: XL_AU_RCV_DONE is received AND AUX data remain AND (AUX_D_MODE Is 0 OR read mode with AUX extraction)

c7: XI_AU_RCV_DONE is received AND AUX data remain AND AUX_D_MODE Is not 0 AND (write mode OR read mode with AUX comparison)

c8: Sequencer operation is completed

Figure 17:
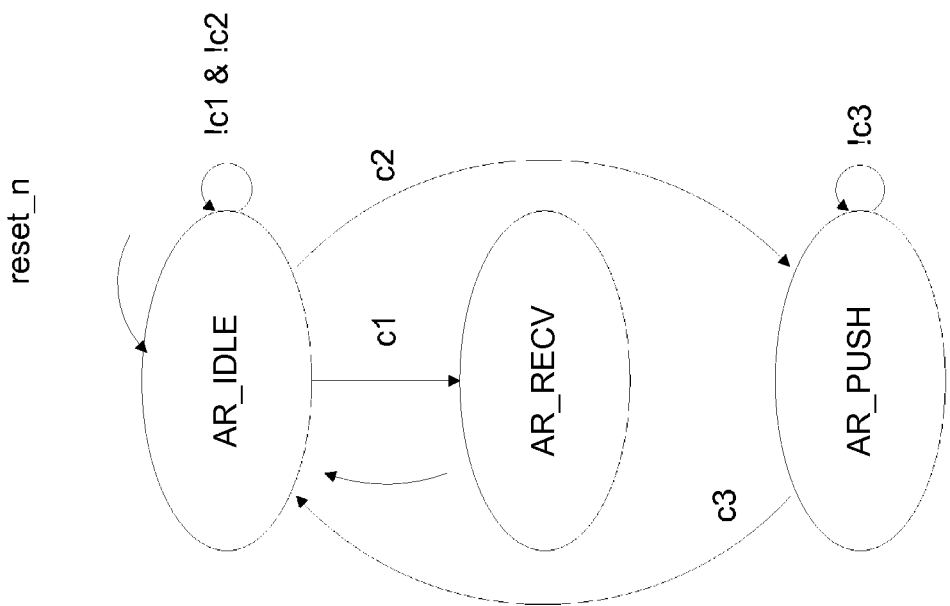
FIG. 17 illustrates receiving transition conditions of a logical RX state machine according to one embodiment of the present invention.

XI_DEC_FAIL: State machine goes to AT_FAIL state when XI_DEC_FAIL Is received regardless of current state TX State Behaviors may include:

AT_IDLE: when c1 or c2 meet, enable ECC, set XI_DEC0_ENC1, and copy AU_LOOP_CNT to TX loop count AT_CHK_FIFO set counter for AUX data fetch AT_SETUP_AU: fetch AUX data from AUX FIFO and store into temporary register AT_STA_AU: send XO_START_AU AT_STA_AU: decrease TX loop count when XO_START_AU is sent AT_WAIT_DONE: when AUX_LOOP_CNT is 0, disable ECC As shown in FIG. 17, RX Transition Conditions may include:

c1: ECC is enabled AND XI_AU_DONE is received AND AUX_LOOP_CNT is not 0 AND (AUX_D_MODE is 0 OR (write mode OR read mode with AUX comparison))

c2: ECC Is enabled AND XI_AU_DONE is received AND AUX_LOOP_CNT Is not 0 AND AUX_D_MODE is not 0 AND read mode with AUX extraction c3: required AUX data are pushed into the FIFO RX State Behaviors may include:

AR_RECV: decrease AUX_LOOP_CNT by 1

AR RUSH: push AUX data into FIFO and decease AUX_LOOP_CNT by 1

Physical domain interface signals may also be controlled by two separate state machines. In addition, there may be another module—track tracer—to trace track status, how many tracks are currently active, and when a track is started and completed. The TX state machine may fetch descriptors from the descriptor FIFO 2016 and send them to the flash I/F controller. At the same time, a track tracer may keep updating track information by using a TRACK bit in the descriptor when one descriptor is sent out. When a descriptor is completed by a flash I/F controller, the RX state machine may receive FC_DES_DONE signal and track tracer may determine if the current track is completed. The Track status may be updated when one track is completed by the flash I/F controller and the firmware may access the TRK_STAT register to check the status of each descriptor in the track.

Figure 18:
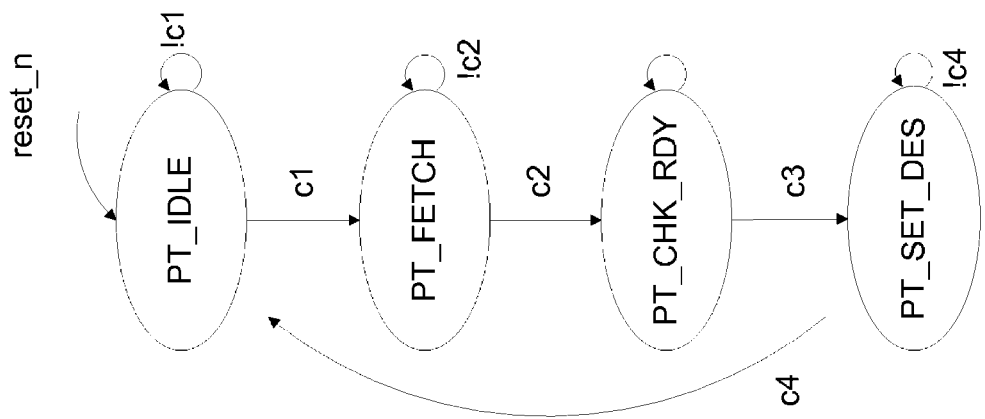
FIG. 18 illustrates physical TX state machine diagrams including transition conditions and behaviors of each physical TX state machine according to one embodiment of the present invention.
Figure 19:
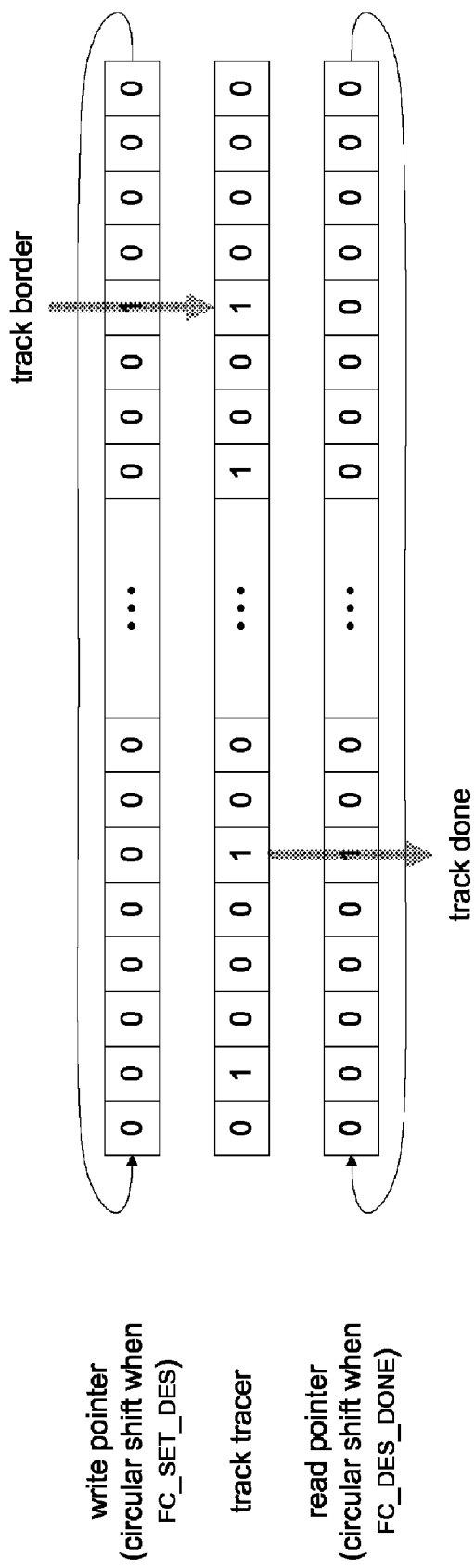
FIG. 19 illustrates a physical track tracer according to one embodiment of the present invention.

FIG. 18 illustrates detailed state machine diagrams including transition conditions and behaviors of each state machine according to one embodiment of the present invention. The TX transition conditions may include:

c1: SEQ_ENABLE is set AND descriptor FIFO is not empty AND number of active tracks is not exceeded c2: Descriptor fetch is done c3: FC_RDY is set c4: FC_SET_DES is sent for 5 fc_clk cycles The TX state behaviors may include:

PT_FETCH: fetch descriptor parameters one by one and store them into temporary register until all descriptor parameters are fetched PT_SET_DES: send FC_SET_PES along with a descriptor for 5 fc_clk cycles and information to track tracer that one descriptor is sent as well as whether the descriptor is for track border or not FIG. 19 illustrates a physical track tracer according to one embodiment of the present invention.

Figure 20:
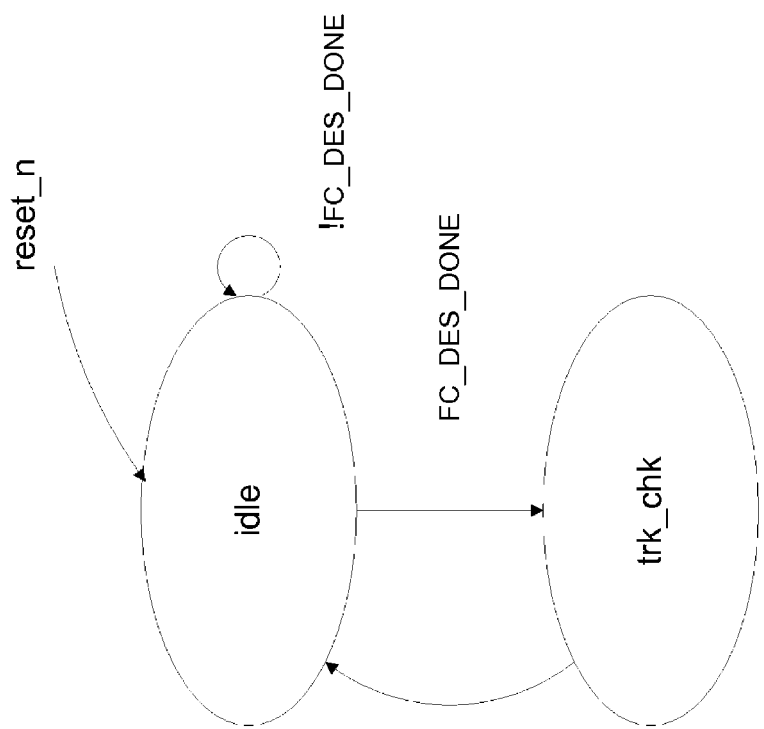
FIG. 20 illustrates a physical RX state machine according to one embodiment of the present invention.
Figure 21:
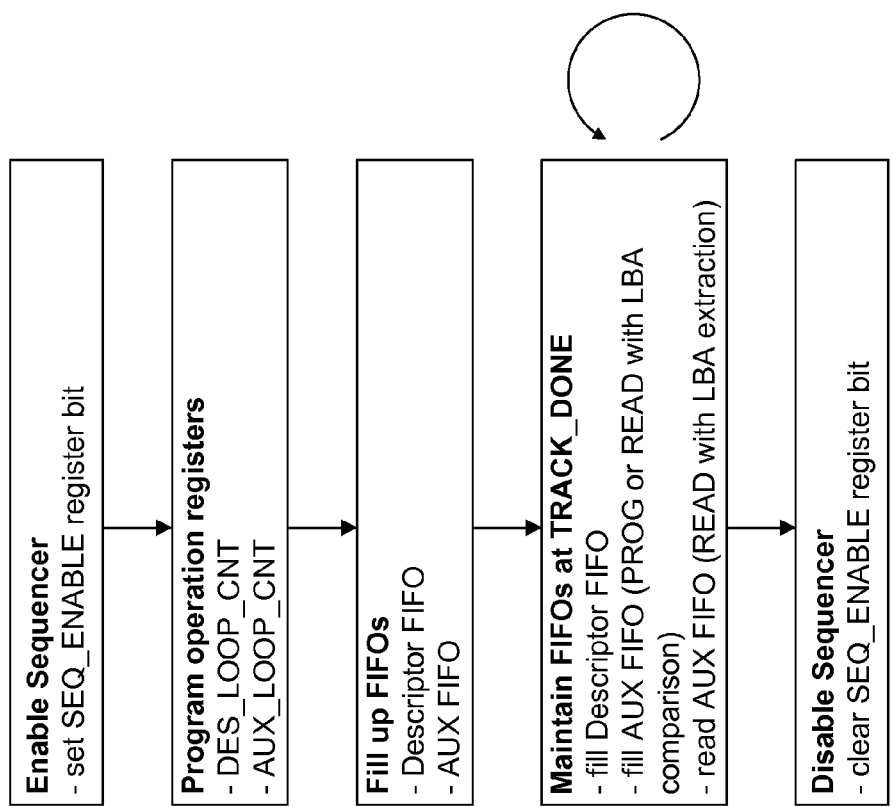
FIG. 21 illustrates the process for programming a sequencer according to one embodiment of the present invention.

FIG. 20 illustrates a physical RX state machine according to one embodiment of the present invention. The RX state behavior may include:

idle: when FC_DES_DONE is received, decrease descriptor loop count and deassert FC_SEND_STATUS trk_chk: assert FC_SEND_STATUS and update track status if track is done 2.5 Sequencer Application 2.5.1 Normal Operation In the normal operation, the firmware 204 may program the sequencer 2014, for example, according to the steps shown in FIG. 21.

2.5.1.1 Enable Sequencer

The sequencer 2014 may need to be enabled by asserting the SEQ_ENABLE register bit before any new operation starts. All the sub-modules may be reset and become clean.

The SEQ_BUSY register bit may be set during the clean-up process but the firmware 204 may program operation registers and FIFOs even before SEQ_BUSY is cleared.

2.5.1.2 Program Operation Registers

Some registers may need to be programmed before the firmware puts descriptors into the descriptor FIFO 2016. Those are DES_LOOP_CNT (total number of descriptors of the new operation) and AU_LOOP_CNT (total number of AUX data of the new operation). If the firmware fails to program these two registers before writing descriptors into the descriptor FIFO 2016, the sequencer 2014 may work incorrectly.

2.5.1.3 Fill Up the Descriptor FIFO (and AUX FIFO if Required)

The firmware 204 may write descriptors into the descriptor FIFO 2016 to define operations of each flash device. The TRACK bit may be set for the last descriptor of a track. Assuming that the maximum number of an active track (MAX ACT_TRK) is set to be two, two tracks may reside in the descriptor FIFO 2016 to maximize the Flash device utilization.

When in the write or read mode with LBA comparison (AUX_D_CMP Is set), the firmware 204 may also fill LBA data (or any other AUX data) into the AUX FIFO 2015. The firmware 204 may keep a sufficient number of AUX data in the AUX FIFO 2015, so that all the descriptors in the descriptor FIFO 2016 may be consumed without hanging. If there is not enough AUX data in the AUX FIFO 2015, the sequencer 2014 may hang until the firmware 204 supplies more AUX data.

There is no requirement on which FIFO should be filled up first. Accordingly, the firmware 204 can either write data into the descriptor FIFO first or write data into the AUX FIFO first.

2.5.1.4 Maintain FIFOs until Operation is Completed

Once the first descriptor is fetched and sent to the flash I/F controller 2013, the firmware 204 may maintain the descriptor FIFO 2016 and the AUX FIFO 2015 until the operation is completed. Usually the firmware 204 may update FIFOs and retrieve status when a track is done and a TRACK_DONE interrupt is detected. When track is done, the firmware 204 may:

Clear interrupt.

Read PHY_FIFO_CNT_CTRL to find out how many descriptors are completed in the last track, and write a negative number to the same register to decrease PHY_FIFO_CNT and to avoid the descriptor FIFO 2016 to overflow.

Write the next track into descriptor FIFO.

In the write or read mode with LBA comparison (AUX_D_CMP is set), write corresponding number of AUX data into the AUX FIFO 2015 so that the AUX FIFO does not become empty.

In the read mode with LBA extraction (AUX_D_CMP is clear), read AUX data from the AUX FIFO 2015 so that the AUX FIFO does not overflow. Since the logical domain is not aligned with the physical domain, it is recommended to read any remaining AUX data in the AUX FIFO 2015 when the TRACK_DONE interrupt is detected. By doing so, the amount of AUX data residing in the AUX FIFO 2015 may be minimized and an AUX FIFO overflow may be avoided. The firmware 204 may know how much AUX data are in the AUX FIFO 2015 by reading AU_LOOP_CNT and subtracting it from the previous AU_LOOP_CNT value (the value when the previous TRACK_DONE Is detected). It is possible that there is no AUX data when the first TRACK_DONE occurs—in which case there is no need to read the AUX data. The firmware may repeat this step until the operation is completed and an OP_DONE interrupt occurs.

In addition to the TRACK_DONE interrupt and the OP_DONE interrupt, there may be other interrupts like TRACK_ERR or EC_FAIL. In such situation, the directions for handling an error condition, as set forth below, may be followed.

2.5.1.5 Disable Sequencer

After the operation is completed and OP_DONE interrupt is detected, the firmware 204 may clear the SEQ_ENABLE register bit to disable the sequencer 2014. Since TRK_STAT will be updated when the sequencer 2014 is disabled, the firmware 204 may read TRK_STAT for the last track before disabling the sequencer 2014. Once the SEQ_ENABLE register bit is turned off, the firmware 204 may wait until SEQ_BUSY signal is cleared before performing any further control to the sequencer 2014.

The ECC 2011, the formatter 2012, and the flash I/F controller 2013 may also be disabled accordingly, but their status registers are accessible until the sequencer 2014 is enabled again for the next operation.

2.5.2 Abort Operation

The sequencer's operation may be aborted anytime even before an operation is done or an error occurs. The firmware 204 may deassert the SEQ_ENABLE register bit to abort the sequencer operation. When abort is requested, XO_EC_ENABLE and FM_ENABLE may be deasserted to disable the ECC 2011, and the formatter 2012, and FC_DES_ABORT may be sent to the flash I/F controller 2013 to abort any pending jobs in the flash devices. The SEQ_BUSY register bit may be set showing that the sequencer 2014 is busy while aborting. The firmware 204 may wait until the SEQ_BUSY is cleared before further proceeding.

Figure 22:
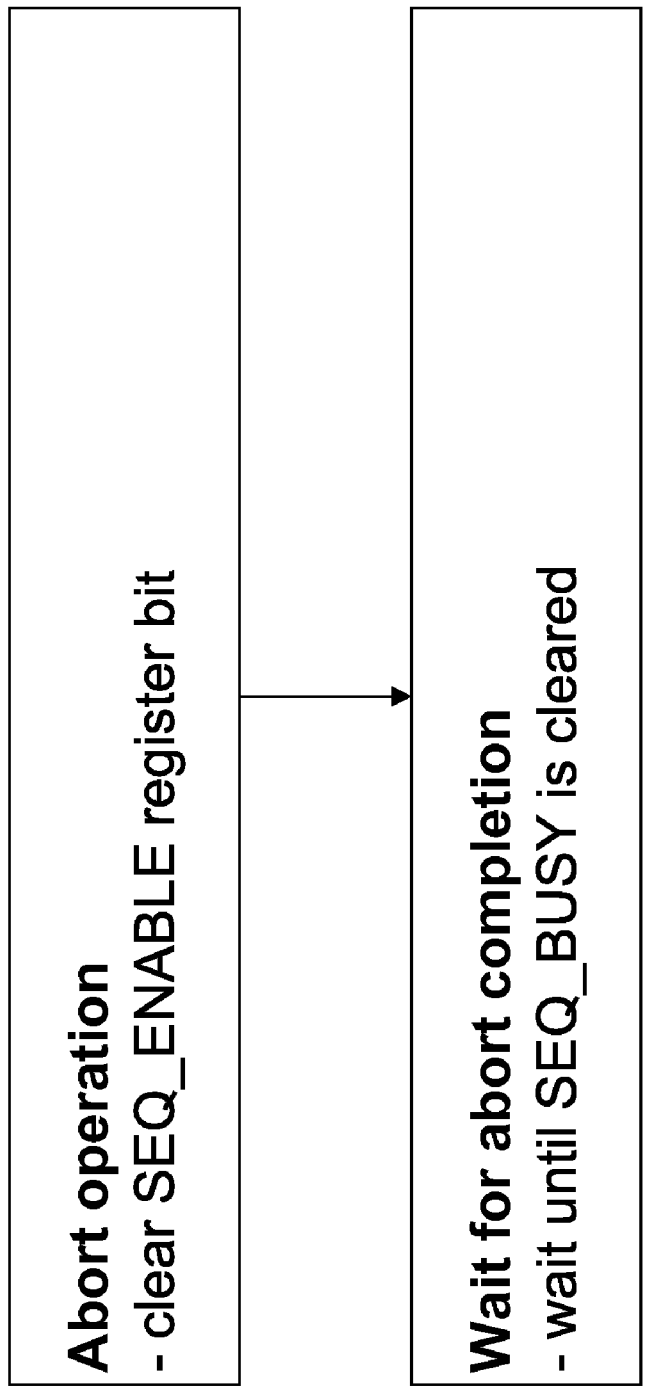
FIG. 22 illustrates the sequencer abort operation according to one embodiment of the present invention.

FIG. 22 illustrates the sequencer abort operation according to one embodiment of the present invention. While the ECC 2011, the formatter 2012 and the flash I/F controller 2013 may be disabled or aborted, the sequencer status registers and configuration registers may keep their values and the firmware 204 may read the registers to determine which jobs are completed and which are aborted. Different registers may provide information depending on the read/write mode.

When a PROG operation or an ERASE operation is aborted, the firmware may check the TRK_STAT register to verify which descriptors in the track are completed successfully. The TRK_STAT register may be updated when the sequencer 2014 is aborted and each bit indicates the status of each descriptor in the aborted track. If a descriptor in the aborted track has status 0 (pass), it is considered to be completed successfully. However, if a descriptor in the aborted track has status 1 (fail), it can be either completed with failure or aborted before completion. In either case, it should be considered as invalid.

Similarly, during a READ operation, the AU_LOOP_CNT register value may indicate how many AUs are successfully transferred to a buffer manager (BM). Some AUs might be in the middle of an ECC processing but not completed when the sequencer 2014 is aborted, and they should be considered as invalid.

2.5.3 Error Handling

Figure 23:
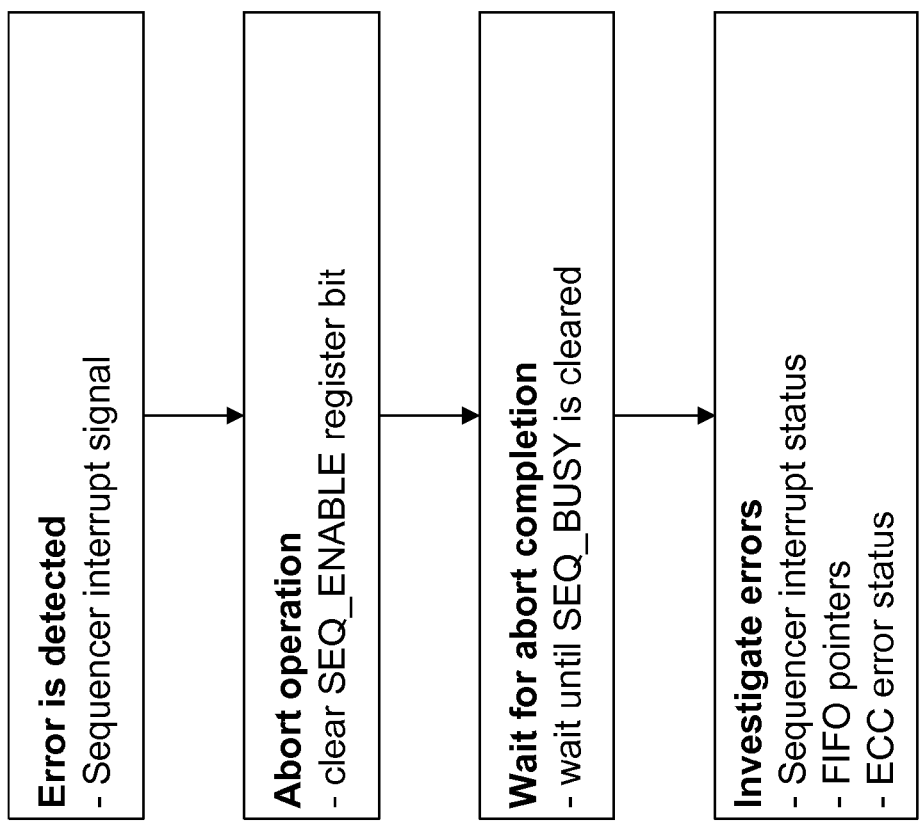
FIG. 23 illustrates a sequencer error operation according to one embodiment of the present invention.

FIG. 23 illustrates a sequencer error operation according to one embodiment of the present invention.

An error pattern may differ depending whether the operation is a READ or PROG operation because an error may come from different domain—logical domain or physical domain.

In case of a PROG or ERASE operation, the error may occur in the physical domain when there is a failure in flash devices. The flash I/F controller may report error status by FC_DES_STATUS along with an FC_DES_DONE signal, and a TRACK_ERR Interrupt may be generated by the sequencer 2014 at the track boundary. The firmware may examine the descriptors of failed track by moving the pointer PHY_RD_PTR to the position of the pointer PHY_LTRK_PTR and read PHY_RD_DATA.

In case of a READ operation, the error may occur in the logical domain when the ECC 2011 finds out that the decoding cannot be completed for an AU. The ECC 2011 may report errors to the sequencer 2014 immediately with an XI_DEC_FAIL signal, and an EC_FAIL interrupt may be generated by the sequencer 2014.

In either case, the firmware may clear the SEQ_ENABLE register bit immediately (and wait until the SEQ_BUSY signal is cleared) to disable all the modules and abort any pending jobs. Table 2-6 shows a list of status registers and pointer registers by which the firmware 204 may debug errors after the sequencer 2014 is disabled.

TABLE 2-6

| Register | Meaning |
| --- | --- |
| TRK_STAT | The status of current track is stored in this register where 0 means success and 1 means failure. F/W can find out which Descriptor of current track has failed. |
| PHY_FIFO_CNT_CTRL | The number of Descriptor of current track can be retrieved by reading This register. |
| PHY_RD_PTR | F/W can move PHY_RD_PTR and read FIFO contents from |
| PHY_RD_DATA | PHY_RD_DATA register. With these two registers the contents of Descriptor FIFO can be retrieved for error investigation. |
| PHY_EXE_PTR | This pointer indicates the Descriptor which is being sent to FC. |
| PHY_LTRK_PTR | This pointer is pointing the first Descriptor of the last completed track. F/W may move PHY_RD_PTR to the same position as PHY_LTRK_PTR to read Descriptors of the last track. |
| PHY_DES_CNT | The counter shows that how many Descriptors remain in the FIFO and not sent to FC yet. |
| DES_LOOP_CNT | The counter shows that how many Descriptors of current operation are not completed. |
| AU_LOOP_CNT | The counter shows how many AUX data of current operation are not completed. |
| AUX_DBG_PTR | F/W can move AUX_DBG_PTR to any location of AUX FIFO and |
| AUX_DBG_DATA | retrieve the content of FIFO by reading AUX_DBG_DATA. |

2.5.4 Soft Reset

Figure 24:
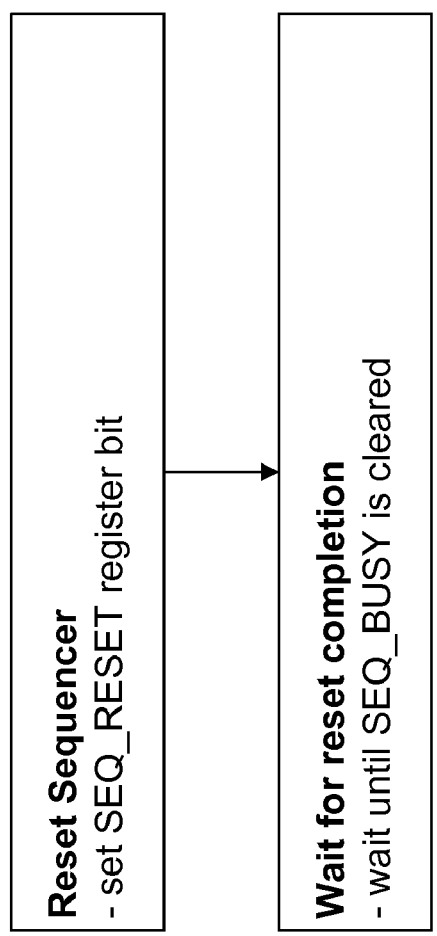
FIG. 24 illustrates a sequence of sequencer reset according to one embodiment of the present invention.

FIG. 24 illustrates the sequence of sequencer reset according to one embodiment of the present invention.

If there is a malfunction or the sequencer 2014 is in the unknown status, the firmware 204 may reset the Sequencer 2014 by asserting the SEQ_RESET register bit to force the sequencer 2014 to enter a clean status. The ECC 2011 and the formatter may also be reset by XO_SEQ_SRESET_N and FM_FC_SRESET_N, and the flash I/F controller 2013 may be reset by FC_DES_ABORT.

3. Operations

Figure 25:
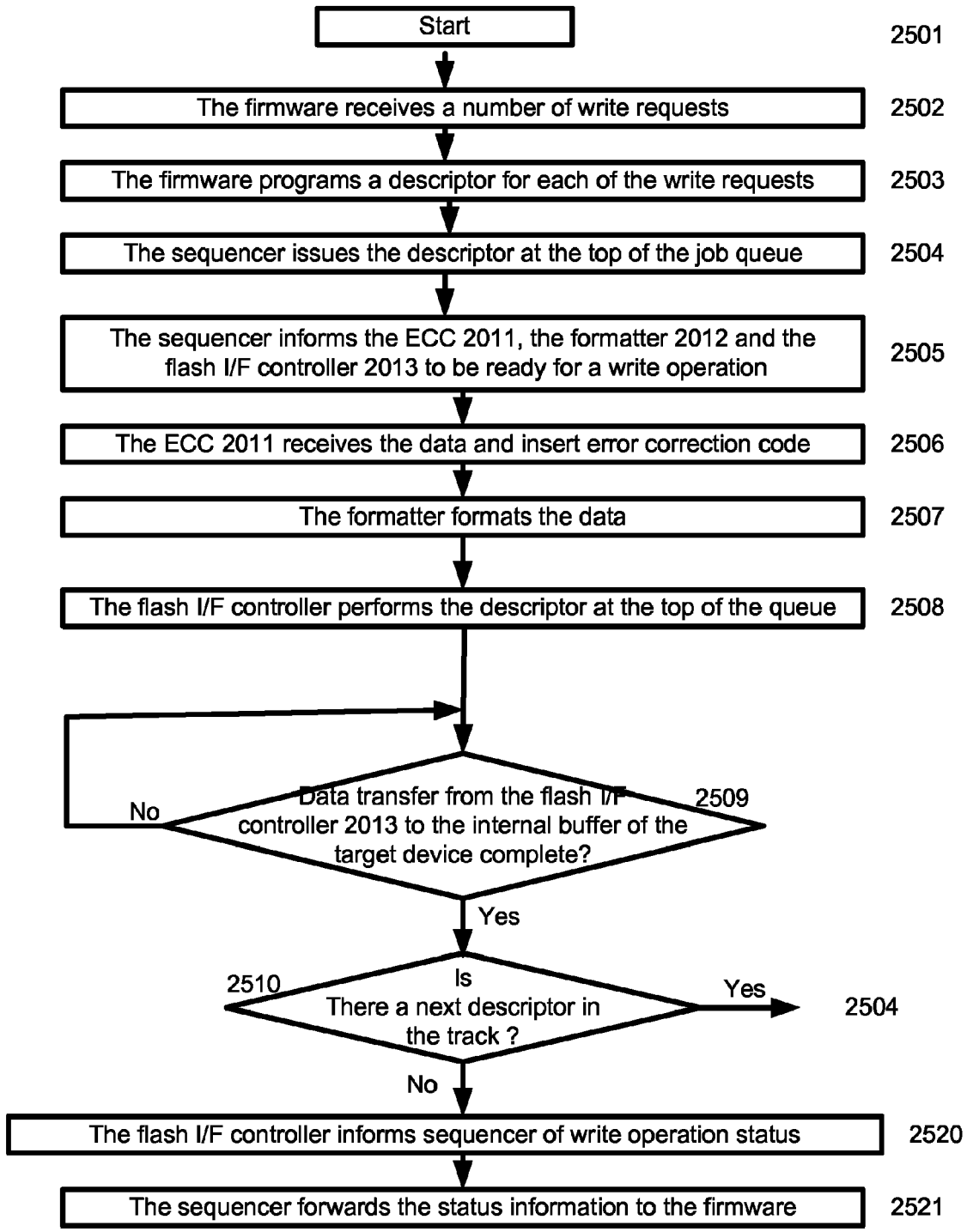
FIG. 25 illustrates a flow chart of write operations according to one embodiment of the present invention.

FIG. 25 illustrates a flow chart of write operations according to one embodiment of the present invention. The write operation may be used in the system shown in FIG. 2A, and may start at 2501.

At 2502, the firmware 204 may receive a number of requests for write operations from the host 102, and may use a job to represent each of the operations.

At 2503, the firmware 204 may program a descriptor for each of the jobs and write the descriptors into the descriptor FIFO 2016. Each descriptor may have information about a write operation, e.g., the target flash memory device, the target channel, the type of operation, LBA of the data, etc. The firmware 204 may provide descriptors without waiting for a response from a memory device, and several jobs may be provided continuously to form a job queue.

In one embodiment, the firmware 204 may put several descriptors into a signal track by setting a T-bit of a descriptor. For example, if the firmware wants to put 16 descriptors in a single track, the T-bit of the 16$^{th}$ descriptor may be set. To increase bandwidth, several tracks may be issued in parallel if target devices are available.

After the firmware 204 finishes programming descriptors, the sequencer 2014 may handle the remaining work so that the firmware 204 may concentrate on other tasks.

At 2504, the sequencer 2014 may check the availability of the target channel and the target device of the descriptor at the top of the job queue, and issue the descriptor from the descriptor FIFO 2016 to the flash I/F controller 2013 as soon as the target memory device of the descriptor becomes available. Several descriptors may be provided and performed in parallel as long as the target devices are available.

At 2505, the sequencer 2014 may inform the ECC 2011, the formatter 2012 and the flash I/F controller 2013 to be ready for a write operation.

At 2506, the data from the host 102 may be sent to the ECC 2011, which may insert error correction code into the data.

At 2507, the formatter 2012 may format the data to conform with the data path of the flash I/F controller 2013.

At 2508, the flash I/F controller 2013 may perform the write operation defined in the descriptor at the top of the job queue, transferring data to an internal buffer of the target flash memory device through the target channel.

At 2509, the sequencer 2014 may determine whether the data transfer from the flash I/F controller 2013 to the internal buffer of the target flash memory device is done.

If yes, at 2510, the sequencer 2014 may determine whether there is a next descriptor in the track. If not, the process may proceed to 2520.

If yes, 2504-2510 may be performed for the next descriptor. If there is more than one descriptor remaining in the track, the one whose target channel and target device become available first may be performed first. The sequencer 2014 does not have to wait for the transaction between the internal buffer of the target flash memory device and the target flash memory device to finish. 2504-2510 may repeat until all write operations in the track are done.

At 2520, the flash I/F controller 2013 may inform the sequencer 2014 as to status of the operation, e.g., whether all write operations are done, which operation is successful, and which operation is failed.

At 2521, the sequencer 2014 may forward the status information to the firmware 204. In one embodiment, if the descriptors were put into a track, the sequencer 2014 may generate an interrupt signal to the firmware 204 when a track is completed, i.e., all jobs defined in the descriptors in the track are complete.

In one embodiment, the sequencer 2014 may collect status of each job in a "Track Status Register" which contains the status of jobs. Once a track is completed and an interrupt signal is generated, the firmware 204 may check the "Track Status Register" to find out if there is any job in the track failed. In addition, the sequencer 2014 may provide information like which descriptors are issued, which job is completed, which job is pending, etc, so that the firmware 204 may easily diagnose and recover from errors.

Figure 26:
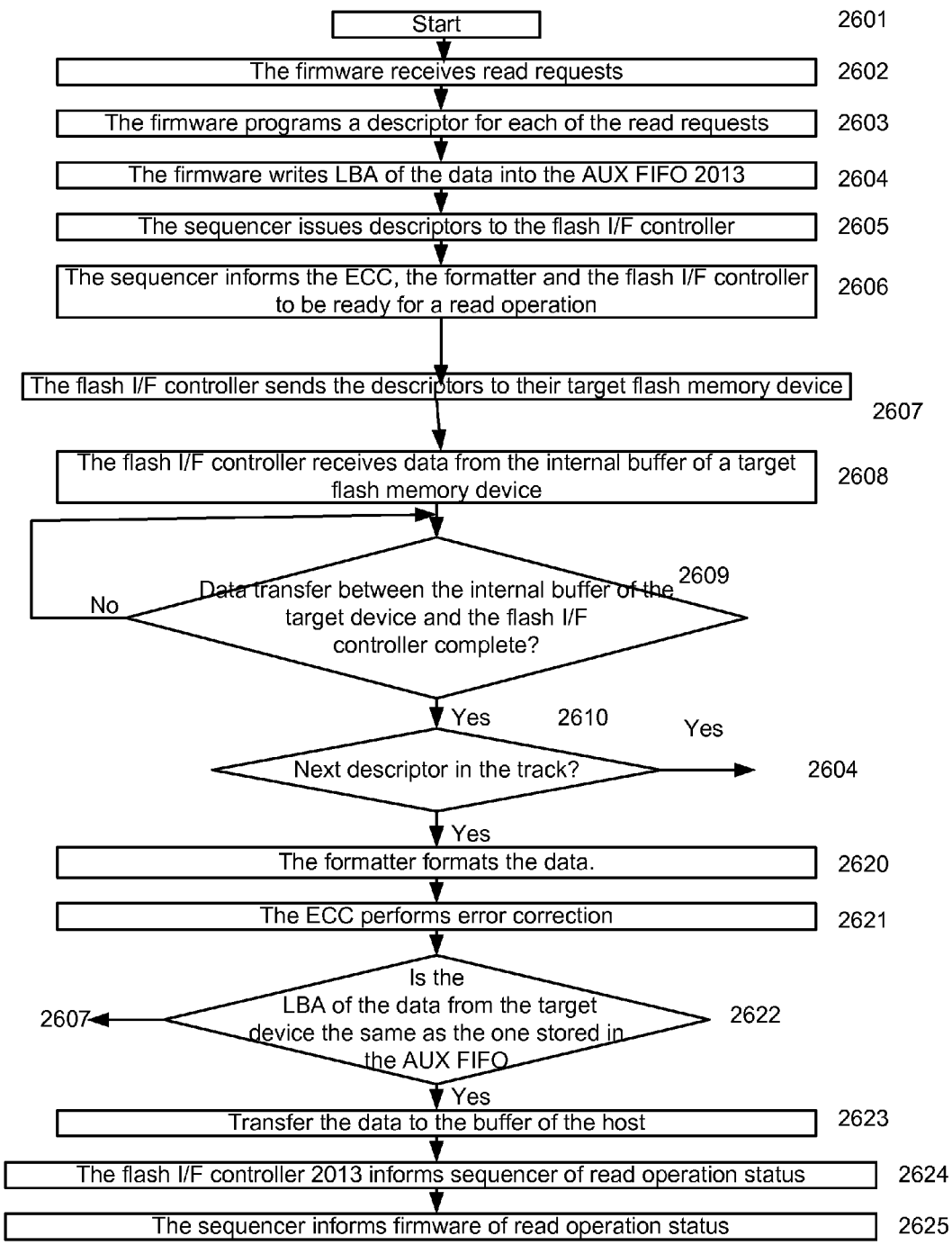
FIG. 26 illustrates a flow chart for a read operation according to one embodiment of the present invention.

FIG. 26 illustrates a flow chart for a read operation according to one embodiment of the present invention. The operation may be used in the system shown in FIG. 2A, and may start at 2601.

At 2602, the firmware 204 may receive a number of requests for read operations from the host 102, and may use a job to represent each of the operations.

At 2603, the firmware 204 may program a descriptor for each of the jobs and write the descriptors into the descriptor FIFO 2016. Each descriptor may have information about a read operation, e.g., the target flash memory device, the target channel, the type of operation, etc. Several jobs may be provided continuously to form a job queue.

In one embodiment, the firmware 204 may put several descriptors into a signal track by setting a T-bit of a descriptor. For example, if the firmware wants to put 16 descriptors in a single track, the T-bit of the $16^{th}$ descriptor may be set. To increase bandwidth, several tracks may be issued in parallel if target devices are available.

After the firmware 204 finishes programming descriptors, the sequencer 2014 may handle the remaining work so that the firmware 204 may concentrate on other tasks.

At 2604, the firmware 204 may write the LBA of the data into the AUX FIFO 2015 if it is in LBA comparison mode.

At 2605, the sequencer 2014 may check the availability of the target channel and the target device of the descriptor at the top of the job queue, and issue the descriptor from the descriptor FIFO 2016 to the flash I/F controller 2013 as soon as the target memory device of the descriptor becomes available. Several descriptors may be provided and performed in parallel as long as the target devices are available.

At 2606, the sequencer 2014 may inform the ECC 2011, the formatter 2012 and the flash I/F controller to be ready for a read operation.

At 2607, the flash I/F controller 2013 may send the descriptors to their target flash memory devices, instructing the target memory devices to start transfer data to their internal buffer.

At 2608, the flash I/F controller 2013 may receive data from the internal buffer of the target flash memory device defined in the descriptor at the top of the job queue.

At 2609, the sequencer may determine whether the data transfer according the descriptor at the top of the job queue is done.

If yes, at 2610, sequencer may determine whether there is a next descriptor in the track. If not, the process may proceed to 2620.

If there is another descriptor in the track, 2604-2610 may be performed for the next descriptor. If there is more than one descriptor remaining in the track, the one whose target channel and target device become available first may be performed first. The sequencer 2014 does not have to wait for the transaction between the internal buffer of the target flash memory device and the target flash memory device to finish. 2604-2610 may repeat until all read operations in the track are done At 2620, while the sequencer 2014 is working on transfer of data from the next descriptor to the flash I/F controller 2013, the formatter 2012 may format the data from the flash I/F controller 2013.

At 2621, the ECC 2011 may decode the data from the target device, and perform error correction.

At 2622, the ECC 2011 may compare the LBA of the data from the target device and the LBA stored in the AUX FIFO 2015 in the LBA comparison mode. If they are different, the procedure may go to 2625 to report error occurrence to the firmware. In the LBA extraction mode, the ECC 2011 may extract LBA data from the AU and send it back to the sequencer to be stored in the AUX FIFO.

If the LBA of the data from the target device and the LBA stored in the AUX FIFO 2015 are the same, the data may be transferred to the buffer 103 at 2623.

At 2624, the flash I/F controller 2013 may inform the sequencer 2014 status of the operation, e.g., whether all read operations are done, which operation is successful, and which operation is failed.

At 2625, the sequencer 2014 may forward the status information to the firmware 204. In one embodiment, if the descriptors were put into a track, the sequencer 2014 may generate an interrupt signal to the firmware 204 when a track is completed, i.e., all jobs defined in the descriptors in the track are complete.

In one embodiment, the sequencer 2014 may collect status of each job in a "Track Status Register" which contains the status of jobs. Once a track is completed and an interrupt signal is generated, the firmware 204 may check the "Track Status Register" to find out if there is any failed job in the track. In addition, the sequencer 2014 may provide information such as which descriptors are issued, which job is completed, which job is pending, etc, so that the firmware 204 may easily diagnose and recover from errors.

Figure 27:
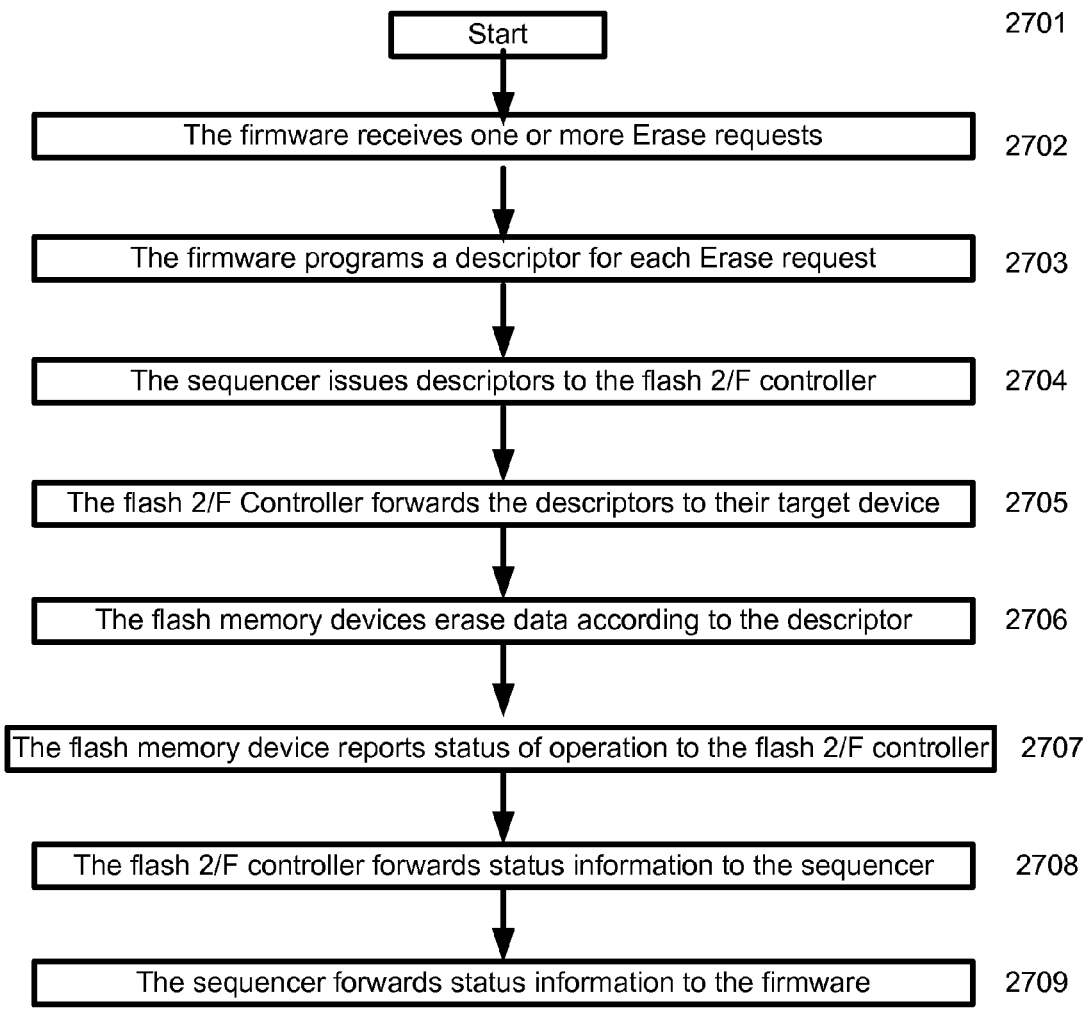
FIG. 27 illustrates a flow chart for an erase operation according to one embodiment of the present invention.

FIG. 27 illustrates a flow chart for an erase operation according to one embodiment of the present invention. The operation may be used in the system shown in FIG. 2A, and may start at 2701.

At 2702, the firmware 204 may receive a number of requests for erase operations from the host 102.

At 2703, the firmware 204 may program a descriptor for each of the erase operation requests.

At 2704, the sequencer 2014 may check the availability of the target channel and the target device of the descriptor at the top of the job queue, and issue the descriptor from the descriptor FIFO 2016 to the flash I/F controller 2013 as soon as the target memory device of the descriptor becomes available. Several descriptors may be provided and performed in parallel as long as the target devices are available.

At 2705, the flash I/F controller 2013 may forward the descriptors to their target flash memory devices.

At 2706, the flash memory devices may erase data according to the descriptor.

At 2707, the flash memory devices may report the status of operation to the flash I/F controller 2013. The status information may be forwarded to the sequencer at 2708, and forwarded to the firmware at 2709.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A method for controlling access to solid state memory devices, wherein the solid state memory devices are coupled to a controller, and the controller is controlled using firmware, the method comprising:
   receiving, from a host, a first operation request and a second operation request;
   programming, using the firmware, a first descriptor for the first operation request and a second descriptor for the second operation request;
   sequencing the first descriptor and the second descriptor via a sequencer;
   transferring first data, according to the first descriptor, from a first solid state memory device of the solid state memory devices to the controller;
   determining whether the transferring of the first data according to the first descriptor has completed; and
   if the transferring of the first data according to the first descriptor has completed, starting a transfer of second data, according to the second descriptor, (i) sequentially after the transferring of the first data, and (ii) from a second solid state memory device of the solid state memory devices to the controller, wherein the second data is transferred to the controller while the first data is being transferred from the controller to the host,
   wherein the sequencer comprises an auxiliary first-in-first-out buffer configured to receive, from a device executing the firmware, logical block address information about data to be transferred.

2. The method of claim 1, wherein the first descriptor includes information about a target device, a target channel, and a type of operation.

3. The method of claim 1, further comprising providing the first descriptor without waiting for a response from a memory device.

4. The method of claim 1, wherein the first descriptor and the second descriptor are provided continuously to form a job queue.

5. The method of claim 4, further comprising placing the first descriptor and the second descriptor in a track.

6. The method of claim 5, wherein the track has 16 descriptors.

7. The method of claim 6, wherein a T-bit of the 16$^{th}$ descriptor is set.

8. The method of claim 5, further comprising determining whether there is another descriptor to be performed in the track.

9. The method of claim 5, further comprising, when all descriptors in a track are completed, generating an interrupt signal and transmitting the interrupt signal to a device executing the firmware.

10. The method of claim 1, further comprising checking availability of a target device before issuing the first descriptor.

11. The method of claim 1, further comprising reporting status of the first operation request and the second operation request to a device executing the firmware.

12. The method of claim 1, wherein the first operation request is a write request, and the first solid state memory device comprises an internal buffer of a target device.

13. The method of claim 12, further comprising performing an error correction parity calculation on data received from the host.

14. The method of claim 1, wherein the first operation request is a read request, and the first solid state memory device comprises an internal buffer of a target device to the controller.

15. The method of claim 14, further comprising storing a logical block address of requested data.

16. The method of claim 14, further comprising performing error correction coding on data received from the host.

17. The method of claim 14, further comprising formatting data transmitted to or received from the host to conform with requirements of the host.

18. The method of claim 1, wherein an amount of time for finishing the data transfer is shorter than an amount of time for finishing the first operation.

19. A method for controlling access to solid state memory devices, wherein the solid state memory devices are coupled to a controller, and the controller is controlled using firmware, the method comprising:
   receiving at least a first operation request and a second operation request from a host, wherein the first operation request is a read request;
   programming, using the firmware, a first descriptor for the first operation request and a second descriptor for the second operation request;
   sequencing the first descriptor and the second descriptor;
   transferring first data according to the first descriptor from an internal buffer of a target device to the controller;
   determining whether the transferring of the first data according to the first descriptor has finished;
   starting to transfer second data according to the second descriptor if the transferring of the first data according to the first descriptor has completed;
   storing a logical block address of requested data; and
   comparing the stored logical block address and a logical block address of the first data obtained from the target device according to the first descriptor.

20. An apparatus for controlling access to solid state memory devices, the apparatus comprising:
   firmware for programming i) a first descriptor for a first operation request and ii) a second descriptor for a second operation request;
   a sequencer for receiving the first descriptor and the second descriptor; and
   a flash controller coupled to the sequencer and to the solid state memory devices, wherein the flash controller is configured to
      (i) receive the first descriptor, the second descriptor, and instructions from the sequencer, and
      (ii) transfer first data according to the first descriptor from a first solid state memory device of the solid state memory devices to the flash controller, wherein the instructions include read requests for transferring the first data and second data,
   wherein the flash controller is configured to start to transfer the second data, according to the second descriptor, from a second solid state memory device of the solid state memory devices to the flash controller when the transferring of the first data according to the first descriptor has finished,
   wherein, prior to the transferring of the first data according to the first descriptor being completed, (i) the flash controller is configured to transmit one of the read requests for the second data to the second solid state memory device, and (ii) the second solid state memory device is configured to transfer the second data to an internal buffer of the second solid state memory device according to the one of the read requests, and
   wherein the sequencer further comprises an auxiliary first-in-first-out buffer configured to receive, from a device executing the firmware, logical block address information about data to be transferred.

21. The apparatus of claim 20, wherein the first descriptor includes information about a target memory device, a target channel, and a type of the operation.

22. The apparatus of claim 20, wherein the sequencer further comprises a descriptor first-in-first-out buffer, configured to receive the first descriptor and the second descriptor from a device executing the firmware.

23. The apparatus of claim 20, further comprising an error correction unit configured to perform error correction coding on data received from a host.

24. The apparatus of claim 20, further comprising a formatter configured to format data from a host to conform with requirements of the flash controller.

25. The apparatus of claim 20, wherein a device executing the firmware provides the first descriptor without waiting for a response from a memory device.

26. The apparatus of claim 20, wherein a device executing the firmware provides the first descriptor and the second descriptor continuously to form a job queue.

27. The apparatus of claim 20, wherein the sequencer checks availability of a target device before issuing the first descriptor to the flash controller.

28. The apparatus of claim 27, wherein the sequencer informs the flash controller to be ready for the type of the operation.

29. The apparatus of claim 20, wherein the sequencer reports a status of operations to a device executing the firmware.

30. The apparatus of claim 20, wherein an amount of time for finishing the data transfer is shorter than an amount of time for finishing the first operation.

31. The apparatus of claim 20, wherein the flash controller is configured to transfer the second data from the internal buffer to the flash controller upon completing the transferring of the first data according to the first descriptor.

32. The apparatus of claim 20, wherein the sequencer comprises:
an auxiliary first-in-first-out buffer configured to store auxiliary data for error correction coding; and
a descriptor first-in-first-out buffer configured to store a plurality of descriptors including the first descriptor and the second descriptor,
wherein the flash controller accesses the solid state memory devices according to a physical block of the second descriptor while performing error correction coding operations according to a logical block of the auxiliary data associated with the first data.

33. The apparatus of claim 30, wherein the flash controller transfers the second data according to the second descriptor from the second solid state memory device to the flash controller while formatting the first data received from the first solid state memory device.

34. The apparatus of claim 20, wherein the first operation request is a read request, and the first solid state memory device comprises an internal buffer of a target device.

* * * * *

UNITED STATES PATENT AND TRADEMARK OFFICE
CERTIFICATE OF CORRECTION

PATENT NO.       : 8,185,713 B2                                    Page 1 of 1
APPLICATION NO.  : 12/212636
DATED            : May 22, 2012
INVENTOR(S)      : Hyunsuk Shin et al.

It is certified that error appears in the above-identified patent and that said Letters Patent is hereby corrected as shown below:

Title page, Item (73) "Assignee:," delete "Travel" and insert --Trade-- therefor.

Signed and Sealed this
Fourteenth Day of August, 2012

David J. Kappos
*Director of the United States Patent and Trademark Office*